United States Patent [19]

Osaka et al.

[11] Patent Number: 6,053,306

[45] Date of Patent: Apr. 25, 2000

[54] CURVED BELT CONVEYOR

[75] Inventors: Hajime Osaka; Masahiro Kobayashi; Kazue Yoda, all of Nagano-ken, Japan

[73] Assignee: Maruyasu Kikai Co., Ltd., Nagano-ken, Japan

[21] Appl. No.: 09/406,925

[22] Filed: Sep. 28, 1999

Related U.S. Application Data

[62] Division of application No. 09/062,385, Apr. 17, 1998, Pat. No. 5,984,084.

[30] Foreign Application Priority Data

| Aug. 8, 1997 | [JP] | Japan | 9-214785 |
| Feb. 12, 1998 | [JP] | Japan | 10-29981 |
| Feb. 13, 1998 | [JP] | Japan | 10-31173 |

[51] Int. Cl.$^7$ .................................................. B65G 15/02
[52] U.S. Cl. .................................... 198/831; 198/837
[58] Field of Search ................................ 198/831, 837, 198/840

[56] References Cited

U.S. PATENT DOCUMENTS

| 4,185,737 | 1/1980 | Blatterman | 198/831 |
| 4,227,610 | 10/1980 | Gerdes et al. | 198/831 |
| 4,485,913 | 12/1984 | Treiber | 198/831 |
| 5,332,083 | 7/1994 | Axmann | 198/831 |
| 5,667,058 | 9/1997 | Bonnet | 198/831 |
| 5,839,570 | 11/1998 | Vertogen et al. | 198/831 |

FOREIGN PATENT DOCUMENTS

| 11962 | 6/1980 | European Pat. Off. | 198/831 |
| 58-34082 | 7/1983 | Japan . | |
| 5-42211 | 6/1993 | Japan . | |
| 5-33459 | 8/1993 | Japan . | |
| 7-277436 | 10/1995 | Japan . | |
| 6704802 | 4/1967 | Netherlands | 198/837 |

*Primary Examiner*—Christopher P. Ellis
*Assistant Examiner*—Khoi H. Tran
*Attorney, Agent, or Firm*—Klauber & Jackson

[57] ABSTRACT

Disclosed is a curved belt conveyor, which comprises a curved belt between rollers, guide rollers supporting the inner peripheral edge of the curved belt, a driving roller set in the outer peripheral section of the curved belt, a pinch roller for pressing the forward run side of the curved belt against the driving roller, and a pinch roller for pressing the return run side of the curved belt against the driving roller. The pinch rollers are supported with their axial centers inclined with respect to the reference line. With the pinch rollers inclined to contact the curved belt, the outer peripheral section of the curved belt is driven towards the outside of turning, thereby preventing bulging and zigzag movement of the curved belt.

2 Claims, 29 Drawing Sheets

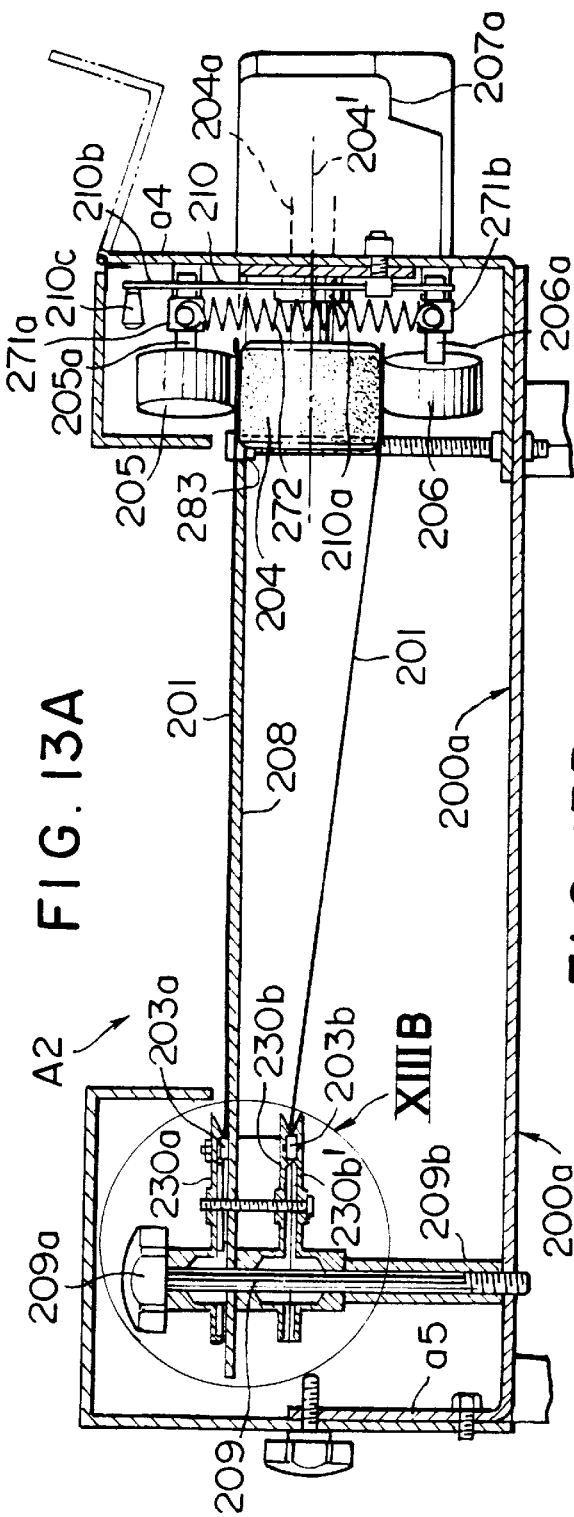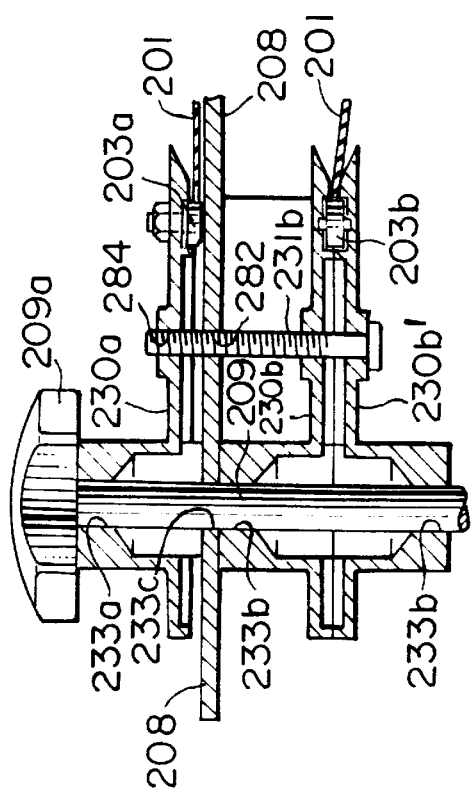

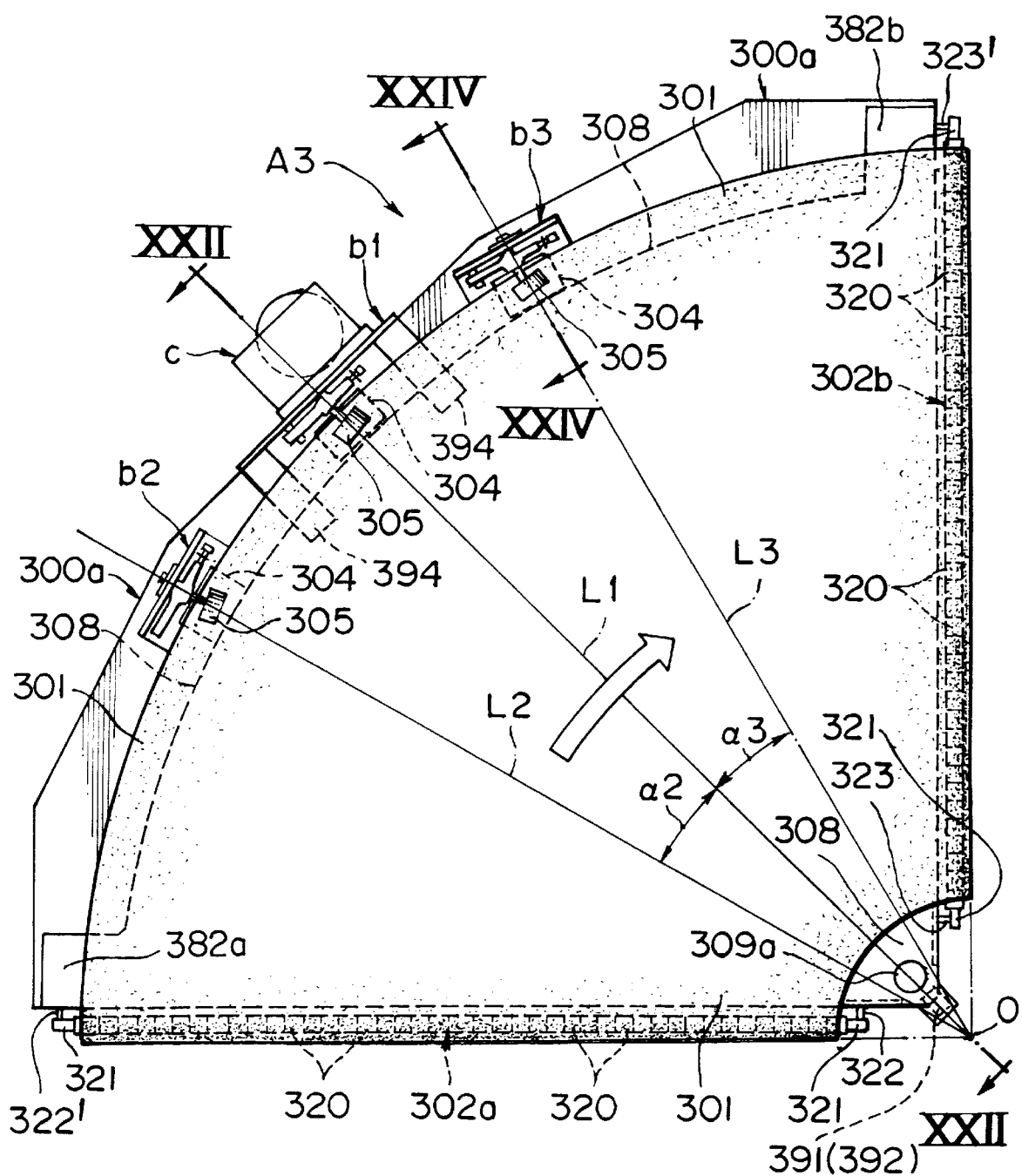

CURVED BELT CONVEYOR

This application is a Division of U.S. application Ser. No. 09/062,385, filed Apr. 17, 1998, now U.S. Pat. No. 5,984,084.

BACKGROUND OF THE INVENTION

1. Field of the Invention

The present invention relates to an improvement in a curved belt conveyor.

2. Description of the Prior Art

FIG. 33 shows a conventional curved conveyor. The curved conveyor is composed of an endless curved belt 100 formed in an approximately conical shape and disposed between rollers 101 and 102 which are set at a predetermined angle in an approximately L-shaped arrangement in a plan view, thereby forming an approximately circular carrying track in a plan view. In the curved belt conveyor thus constituted, when the belt 100 is driven, a force F1 acts in the tangential direction of the circle having the turning center O of the belt 100 and at the same time a force F2 acts to move the belt 100 towards the turning center O.

The conventional curved belt conveyor, therefore, is constituted such that the belt is supported, along the outer peripheral edge, with a number of supporting mechanisms, such as beads and guide rails, chains, rollers, etc., for rotatably supporting the outer peripheral section of the belt, receiving the force F2 acting to move the belt towards the center of turning as described above and transmitting a driving power from a driving power source to drive the belt (Japanese Utility Model Laid-Open No. Hei 5-42211 and Japanese Utility Model Publication No. Sho 58-34082). It is, however, demanded to improve the above-described curved belt conveyor by obviating such disadvantages as troublesome maintenance, an increase in noise, and an increase in cost likely to be caused by the use of complicated supporting mechanisms along the outer peripheral section of the belt.

Furthermore, in the curved belt conveyor, because the rollers 101 and 102 supporting both ends of the curved belt are formed in a conical shape with relation to the peripheral speed of the belt, both ends of the carrying track are also formed conical. Consequently, large-diameter rollers are used in a junction with another conveyor, particularly on the outer peripheral side of the carrying track, forming a big difference in level at the junction section on the outer peripheral side of the carrying track, resulting in such a trouble as a shift or fall of loads and accordingly unsmooth transfer, particularly in carrying small, light-weight materials, at the junction section.

Some conventional curved belt conveyors so far developed are provided with a number of small cylindrical rollers, at both ends of the conveyor, continuously in the direction of the axial center to decrease the difference in level at junctions at both ends of the conveyor. It is, however, understood that because of a difference in the peripheral speed of the curved belt, the force F2 that acts to move the belt towards the center of turning increases.

To obviate the disadvantage stated above, there has been developed a curved belt conveyor as has been disclosed in Japanese Patent Laid-Open No. Hei 7-277436, in which no support mechanism is provided to support the outer peripheral edge section of the conveyor belt, but guide rollers are employed to support the inner peripheral edge of the curved belt from the inside while receiving the force F2 which acts to shift the belt towards the center of turning.

The curved belt described above is provided, in the thick inside structure of the belt, with a tough material which extends in the direction of width of the belt to increase belt strength in the direction of width, thereby preventing bend and deformation in the direction of width of the belt.

However, the force F2 which moves the curved belt towards the center of turning as described above tends to increase with an increase in the belt width; therefore the curved belt, though usable within a narrow range of belt width, cannot withstand the increase in the belt width, resulting in such a symptom of deformation as bulging at the central part of the belt.

The bulging of the above-described conveyor belt will give an adverse effect to loads if a difference in level at a junction at either end of the conveyor is reduced and small, short, light-weight pieces can be carried and transferred. That is, the curved belt conveyor described above is effective only for the use of a narrow belt.

In the meantime, the Japanese food industry is speeding up the introduction of the hazards analysis and critical control points (HACCP) that have been proposed in the U.S.A. for the purpose of preventing pathogenic bacteria such as O-157. In the case of a belt conveyor system used in food processing facilities, sanitary controls conforming to the HACCP are under consideration.

For example, to keep the belt conveyor hygienically clean, it is desirable to regularly remove, and carefully wash and sterilize the belt conveyor and the belt itself in order to prevent propagation of various germs. In some straight belt conveyors that have been developed, the end section of the conveyor is raised to enable easily reducing the belt tension (Japanese Utility Model Publication No. Hei 5-33459). In the curved belt conveyor, however, since the support mechanisms are extremely complicated as previously described, even a skilled operator needs considerable time to slacken the curved belt, often being forced to do troublesome work at the time of washing and sterilizing operation.

Also, in some conveyor lines using the curved conveyor, the direction of conveyance for carrying loads on the curved conveyor is not limited to one definite direction, and is sometimes required to be reversed. The curved conveyor, therefore, is required to have a function capable of easily reversing the direction of drive.

It is, therefore, an object of the present invention to provide a curved belt conveyor as described above that can realize, by the use of a simple driving mechanism, a curved belt conveyor with a wide belt capable of minimizing a difference in level at junctions at both ends of the conveyor, and furthermore is equipped with the function that facilitates mounting and removal of the curved belt.

SUMMARY OF THE INVENTION

To solve the aforementioned problems, the curved belt conveyor of the present invention is comprised of an endless curved belt mounted between rollers or knife edges disposed at both ends of the conveyor to form an approximately circular conveyor track in a plan view, guide rollers supporting the inner peripheral edge portion of the curved belt from the inside of turning, a driving roller inserted between the forward and return run sides on the outer peripheral section of the curved belt and rotatably supported with the axial center aligned with the reference line extending towards the outer peripheral section of the belt from the center of turning of the curved belt in the plan view, pinch rollers mounted on the forward surface on the outer peripheral section of the curved belt to press the curved belt against the outer peripheral surface of the driving roller, and pinch rollers mounted below the return surface of the outer peripheral section of the curved belt to press the curved belt against the outer peripheral surface of the driving roller; the pinch rollers on both the forward run side and the return run side being rotatably supported with the axial center of each pinch roller inclined in a predetermined direction with respect to the reference line in a plan view. The pinch rollers, when rotated, contact the outer peripheral section of the curved belt, thereby pressing the curved belt towards the outside of turning.

According to the above-described means, the endless curved belt is mounted between the rollers or the knife edges arranged at both ends of the conveyor, constituting an approximately circular carrying track in a plan view.

On the inner peripheral side of the curved belt are disposed guide rollers, which support the inner peripheral edge of the curved belt from inside, to thereby restrain the curved belt from moving towards the center of turning.

Between the forward run side and the return run side of the outer peripheral section of the curved belt, the driving rollers are disposed. The driving rollers are rotatably supported with the axial center aligned with the reference line extending towards the outer peripheral section of the belt from the center of turning.

In the meantime, the pinch rollers are disposed on the forward surface and the return surface of the curved belt, pressing from both sides of the curved belt against the outer peripheral surface of the driving rollers.

Both the forward surface and the return surface of the curved belt are held between the driving rollers and the pinch rollers; in this state since the curved belt is being pressed by the pinch rollers, there takes place a frictional force between the outer peripheral surface of the driving rollers and the inner surface of the curved belt, and between the outer peripheral surface of the curved belt and the pinch rollers.

With the rotation of the driving rollers, the curved belt operates; and furthermore with the operation of the curved belt, the pinch rollers on both the forward run side and the return run side rotate.

The pinch rollers on both the forward run side and the return run side are supported with the axial center of each roller inclined to a predetermined direction with respect to the reference line in a plan view, so that the pinch rollers will rotate in contact with the curved belt at the inclination angle stated above.

The contact force of the pinch rollers on both the forward run side and the return run side works, by the same amount as the inclination angle, towards the outside of turning. As a result, the outer peripheral section of the curved belt on both the forward run side and the return run side is pressed toward the outside of turning. The pressure produced at this time acts as a pressure for pulling the curved belt in the direction of width, to thereby prevent bulging and slackening at the center of the belt.

The curved belt conveyor according to claim 2 has a pair of rollers comprising a number of small, approximately cylindrical rollers which are juxtaposed on the same axial center to form an approximately long shaft and are so constituted that each of the small rollers freely rotates; an endless and level curved belt mounted between both rollers or the knife edges disposed at both ends of the conveyor to form an approximately circular carrying track in a plan view; guide rollers supporting the inner peripheral edge portion of the curved belt from the inside of turning; a driving roller interposed between the forward run side and the return run side in the outer peripheral section of the curved belt and reversibly supported with the axial center aligned with the reference line extending towards the outer peripheral section of the belt from the center of turning of the curved belt in the plan view; and pinch rollers disposed on the forward surface of the outer peripheral section of the curved belt to press from both sides of the curved belt against the outer peripheral surface of the driving roller, and pinch rollers disposed below the return surface to press from both sides of the curved belt against the outer peripheral surface of the driving roller.

In the curved belt conveyor, the shafts of the pinch rollers on both the forward run side and the return run side are protruded towards the outside of turning of the curved belt; a pivot is inserted through approximately vertically at the midpoint of the protruding portion of the shafts; and the pinch rollers are pivotally mounted to be swing along the forward run side and the return run side of the curved belt with the reference line set at neutral in a plan view.

Also, there is provided a changeover lever which swings on the center of the axial center of the driving roller; the changeover lever being engaged at one end thereof with the protruding end of the shaft of the pinch roller on the forward run side, and at the other end with the protruding end of the shaft of the pinch roller on the return run side.

The changeover lever is swung in a normal or a reverse direction in interlock with a change in the direction of operation of the driving roller; thus the pinch rollers on both the forward run side and the return run side simultaneously swing. The axes of these pinch rollers, therefore, move beyond the reference line mutually in opposite direction, so that the pinch rollers will be inclined to a predetermined angle to a predetermined direction with respect to the reference line.

In the above-described constitution, during the normal and reverse rotation of the driving roller, the pinch rollers rotate to contact the outer peripheral section of the curved belt to constantly press the curved belt to the outside of turning.

According to the above-described means, the endless curved belt is mounted between both rollers arranged at both ends of the conveyor, making up the approximately circular carrying track in a plan view.

The rollers include a number of small, approximately cylindrical rollers juxtaposed on the same axial center to form an approximately long shaft, so that each of the small rollers freely rotates. The small rollers thus juxtaposed on the same axial center, therefore, rotate freely and independently. The curved belt, being mounted between the rollers, runs at different peripheral speeds between the inner peripheral side and the outer peripheral side during operation. The small rollers, therefore, rotate at a peripheral speed in respective positions in order to eliminate a difference in the peripheral speed among the small rollers.

Since the curved belt has a flat outer peripheral section, there exists no projection on the outer peripheral section of the curved belt, forming a flat, smooth outer peripheral section which is a carrying surface.

On the inner peripheral side of the curved belt are mounted guide rollers, by which the inner peripheral edge of the curved belt is supported from inside to restrain the curved belt from moving towards the center of turning.

The curved belt, like the curved belt of claim 1 described above, is equipped with a driving roller, pinch rollers for pressing the curved belt against the outer peripheral surface of the driving roller, and pinch rollers mounted below the return surface of the outer peripheral section of the curved belt to press the curved belt against the outer peripheral surface of the driving roller.

Both the forward and return surfaces of the curved belt, therefore, are held by the driving roller and the pinch rollers.

The shaft of the pinch roller on either of the forward run side and the return run side is protruded out from the outer peripheral section of the curved belt, and a pivot is inserted approximately vertically in the midpoint of the projecting portion of the shaft to thereby pivotally support the pinch roller. Both pinch rollers described above, therefore, swing along the forward surface and the return surface of the curved belt on the center of the pivot. Also, at this time, the pinch rollers swing on the neutral of the reference line extending from the center of turning of the curved belt towards the outer peripheral section of the belt in a plan view.

The swinging operation of the pinch rollers is performed by operating the changeover lever. The changeover lever is supported coaxially on the axial center of the driving roller, to swing on the center of the axial center. One end of the changeover lever is engaged with the projecting end portion of the shaft of the pinch roller on the forward run side, and the other end portion of the changeover lever is engaged with the projecting end portion of the shaft of the pinch roller on the return run side.

When the changeover lever is swung to the normal and reverse directions on the center of swinging as a fulcrum, one end and the other end of the lever are swung to opposite directions from the neutral reference of the vertical line which passes through the center of swinging of the lever. As a result, the shafts of the pinch rollers engaged with one end and the other end of the changeover lever on both the return run side and the forward run side swing to thereby simultaneously swing both pinch rollers supported on these shafts.

At this time, the axes of the pinch rollers on both the forward run side and the return run side move in opposite directions beyond the reference line, operating to incline to a predetermined angle in a predetermined direction with respect to the reference line. That is, even when the changeover lever is swung in either the normal or the reverse direction, the pinch rollers will be supported in an inclined state at a predetermined angle in opposite directions from the reference line.

Furthermore, as the changeover lever is switched between normal and reverse directions, the direction of rotation of the driving roller is also changed over between the normal rotation and the reverse rotation.

With the swinging operation of the changeover lever, the pinch rollers on both the forward run side and the return run side, therefore, are supported, with each axial center inclined by a predetermined angle to the normal direction or the reverse direction with respect to the reference line in a plan view. The pinch rollers, while maintaining this state, rotate in contact with the curved belt through the inclination angle.

The contact force of the pinch rollers on both the forward run side and the return run side constantly acts towards the outside of turning circle by the same amount as the inclination angle even during the normal rotation and reverse rotation of the driving roller. Consequently, the outer peripheral section on both the forward run side and the return run side of the curved belt is pressed towards the outside of turning circle even during the normal rotation and reverse rotation of the driving roller. The pressure works as a tension to be applied to the curved belt in the direction of width, thereby preventing occurrence of bulging and slackening at the central portion of the belt.

In the curved belt conveyor according to claim 3 and claim 4, the guide rollers in the curved belt conveyor of claim 1 or claim 2 are axially mounted on a base member; the base member being removably fastened in relation to a predetermined position of a fastening member on the inner peripheral side of the curved belt to thereby set the guide rollers in their support positions at the inner peripheral edge of the curved belt.

According to the above-described means, the guide rollers are mounted on the base member. The base member is removably set with respect to a fastening member on the inner peripheral side of the curved belt, so that the guide rollers are mounted in a support position at the inner peripheral edge of the curved belt.

With the removal of the base member from the fastening member, members supporting, from the inner peripheral side, the curved belt which is mounted between both rollers and the knife edges are also removed; that is, the guide rollers are removed. Therefore it becomes possible to draw the endless curved belt out toward the inner peripheral side from between the rollers and the knife edges at the both ends of the conveyor.

Reversely, it is possible to mount the removed curved belt by setting the base member for the guide rollers between the rollers and the knife edges at both ends of the conveyor after fitting the outer peripheral side of the belt between the rollers and knife edges at both ends of the conveyor from the inner peripheral side of the conveyor.

The curved belt conveyor according to claim 5 comprises a pair of rollers including a number of small, approximately cylindrical rollers which are juxtaposed on the same axial center to form an approximately long shaft in an external shape and are so constituted that each of the small rollers freely rotates; the pair of rollers being arranged at both ends on the conveyor body; a flat, endless curved belt which constitutes an approximately circular carrying track in a plan view between both rollers or knife edges; and a plurality of belt pinching units arranged along the outer peripheral section of the curved belt in the conveyor body. Each of the belt pinching units includes a intermediate roller mounted between the forward run side and the return run side in the outer peripheral section of the curved belt and rotatably supported with its axial center aligned with the reference line extending from the center of turning of the curved belt towards the outer periphery of the belt in a plan view, pinch rollers mounted on the forward surface at the outer peripheral section of the curved belt to press the curved belt against the outer peripheral surface of the intermediate roller, and pinch rollers mounted below the return surface at the outer peripheral section of the curved belt to press the curved belt against the outer peripheral surface of the intermediate roller. The intermediate roller of at least one of the belt pinching unit is connected with a driving mechanism for driving to rotate the intermediate roller to thereby drive the curved belt held between the outer peripheral surface of the intermediate roller and the pinch rollers on both the forward run side and the return run side. Also, each pinch roller on either of the forward run side and the return run side of each belt pinching unit is rotatably supported with its axial center inclined to a predetermined direction with respect to the reference line in a plan view, so that both pinch rollers, when driven, come into contact with the curved belt, pressing the outer peripheral section of the curved belt towards the outside of turning.

According to the above-described means, the endless curved belt is mounted between both rollers disposed at both ends of the conveyor, thereby forming an approximately circular carrying track in a plan by the curved belt.

The rollers disposed at both ends on the conveyor body are comprised of a number of small, short, cylindrical rollers arranged coaxially to form an approximately long shaft, so that the small rollers can rotate freely and separately.

Between the rollers there is mounted an endless curved belt with a level outer peripheral section; the curved belt forms an approximately circular carrying track in a plan.

Furthermore, a plurality of belt pinching units are mounted along the outer peripheral section of the curved belt in the conveyor body.

The belt pinching units include a intermediate roller, and pinch rollers on both the forward run side and the return run side.

The intermediate roller is rotatably interposed between the forward run side and the return run side of the outer peripheral section of the curved belt. The pinch rollers on both sides are disposed on the forward run side and beneath the return run side of the curved belt, being pressed against the outer peripheral surface of the intermediate rollers.

Therefore the forward and return surfaces of the curved belt are pressed by the intermediate roller and the pinch rollers; in this state there is produced a frictional force by the pressure of the pinch rollers between the outer peripheral surface of the intermediate roller and the inner surface of the curved belt, and between the outer peripheral surface of the curved belt and the pinch rollers.

The driving mechanism is connected to the intermediate roller of at least one of the belt pinching units to drive the intermediate roller. With the rotation of the intermediate roller, therefore, the curved belt turns; and with the turning of the curved belt the pinch rollers on both the forward run side and the return run side rotate.

The pinch rollers on both the forward run side and the return run side corresponding to the intermediate rollers thus rotating are supported with their axes inclined to a predetermined direction with respect to the reference line in a plan view, to thereby contact the curved belt at an inclination angle to turn the curved belt. The contact force of the pinch rollers on both the forward run side and the return run side acts towards the outside of turning by the same amount as the inclination angle, consequently applying a pressure to the outer peripheral sections of the curved belt on both the forward run side and the return run side towards the outside of turning.

The pressure serves to restrain the movement of the curved belt towards the outside of turning circle, and also to pull the belt in the direction of width, thus preventing bulging and slackening at the central section of the belt.

In the meantime, in the belt pinching unit in which the driving mechanism is not connected to the intermediate roller, the intermediate roller as described above does not rotate by itself. However, with the turning of the curved belt, the intermediate roller and the pinch rollers pressing both the forward run side and the return run side of the curved belt receive the contact force of the pressing unit to follow the turning of the curved belt.

Furthermore, the pinch rollers of the belt pinching unit on both the forward run side and the return run side are in contact with the curved belt at the inclination angle similarly to the above-described pinch rollers. Therefore, in the pinch rollers, similarly to the pinch rollers of the belt pinching unit at the central section, the contact force for pressing the pinch rollers into contact with the curved belt acts towards the outside of turning by the same amount as the inclination angle. The pressure, in the mounting section of the belt pinching units on both sides, is applied to move the outer peripheral section on both the forward and return run sides of the curved belt towards the outside of turning.

That is, there is produced a pressure to move the curved belt towards the outside of turning at each mounting position of the belt pinching unit, to thereby impart a tension to the curved belt in order to prevent bulging and slackening of the belt.

The curved belt conveyor according to claim 6 has a base plate of an approximately level shape supporting, from below, the forward run side of the curved belt in the curved belt conveyor of claim 5; and a releasable holding member for holding the portion on the turning center side of the base plate, at a predetermined level on the conveyor body member. An upper support roller is disposed below the portion on the turning center side of the base plate, while a lower support roller is mounted on the conveyor body member located immediately below the upper support roller. That is, the upper and lower support rollers are oppositely mounted, with the outer peripheral surfaces thereof kept in contact.

According to the above-described means, the forward run side of the curved belt is supported level from the lower surface side by the base plate. The portion on the turning center side of the base plate is held at a predetermined level on the conveyor body member by means of a removable holding member.

Furthermore, the upper support roller is provided below the portion on the turning center side of the base plate in such a manner that the outer peripheral surfaces of this upper support roller and the lower support roller mounted on the conveyor body member are contiguously disposed, thereby supporting the base plate from below.

That is, the portion on the turning center side of the base plate is supported by both the holding member and the upper and lower support rollers which are oppositely disposed. Therefore, the portion on the turning center side of the base plate is supported from below by the upper and lower support rollers if the holding member is removed, maintaining the base plate in an original mounted position. If, therefore, the supporting force of the upper and lower support rollers is removed, the base plate at the turning center side will droop and be deformed with its own weight because of absence of any other support member.

The curved belt can be removed as follows: the belt is first released from each pressing unit; the base plate is detached from the holding member as described above; the endless curved belt mounted between rollers at both ends of the conveyor body is drawn toward the inner peripheral side; and then the return run side (the lower surface side) of the curved belt is drawn out through between the upper and lower support rollers. At this time the upper and lower support rollers with their outer peripheral surfaces mutually contiguously disposed rotate with the passage of the curved belt thereon, thereby allowing smooth passage of the curved belt.

Reversely, the curved belt can be assembled by inserting the return run side of the removed curved belt between the upper and lower support rollers, and then by inserting the curved belt between the rollers at both ends of the conveyor body.

BRIEF DESCRIPTION OF THE DRAWINGS

FIG. 13A is a sectional view taken along line XIIIA—XIIIA in FIG. 12, and FIG. 13B is an enlarged view of a portion enclosed by a circle;

FIG. 18A and FIG. 18B show a driving condition in normal operation, wherein FIG. 18A is a front view showing the driving roller and the pinch roller section, and FIG. 18B is a plan view of the same;

FIG. 19A and FIG. 19B show a driving condition in reverse operation, in which FIG. 19A is a front view showing the driving roller and the pinch roller section, and FIG. 19B is a plan view of the same;

FIG. 20A and FIG. 20B are explanatory views showing the dynamic balance of each part in reverse operation, in which FIG. 20A shows the forward run side, and FIG. 20B shows the return run side;

FIG. 21 is a plan view showing an embodiment of the present invention of the curved belt conveyor according to claim 5;

FIG. 26A and FIG. 26B show a driving condition during normal operation, in which FIG. 26A is a front view showing the driving roller and the pinch roller section, and FIG. 26B is a plan view of the same;

FIG. 27A and FIG. 27B are explanatory views showing the dynamic balance of each part during normal operation, in which FIG. 27A shows the forward run side, while FIG. 27B shows the return run side;

DESCRIPTION OF THE PREFERRED EMBODIMENTS

Figure 1:
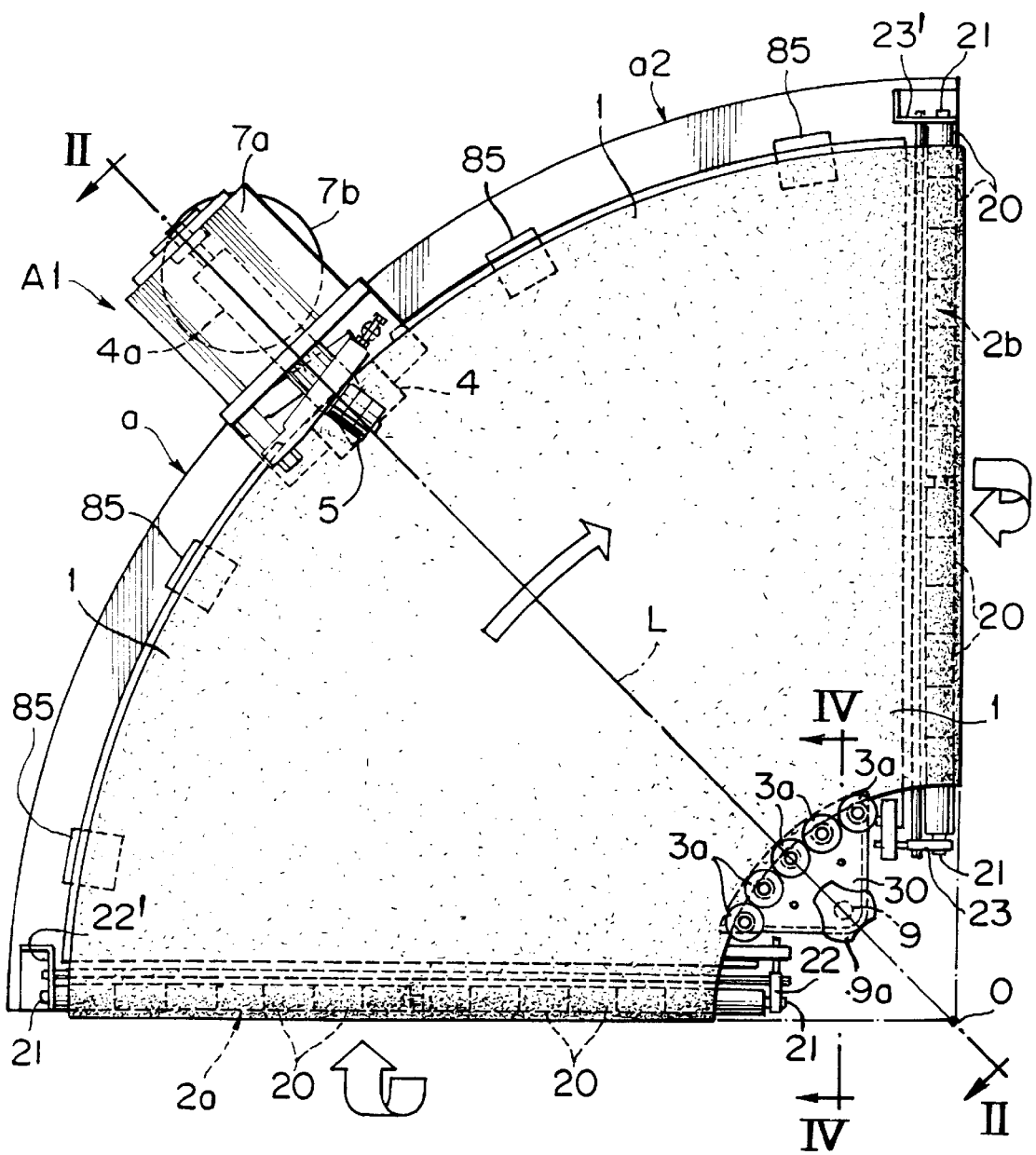
FIG. 1 is a plan view showing an embodiment of the present invention of a curved belt conveyor according to claim 1.

One preferred embodiment of the present invention will be hereinafter described with reference to the accompanying drawings.

A curved belt conveyor A1 shown in FIG. 1 to FIG. 7 forms a load carrying line, in which loads to be carried are loaded onto the conveyor at the starting end of the conveyor, and are carried along a carrying track turning in a circular form, being discharged out toward the direction intersecting at right angles with the direction in which the loads to be carried are brought in; and the curved belt conveyor A1 is set at the junction of an ordinary conveyor line, forming a material conveyor line for carrying the loads at right angles.

In the curved belt conveyor A1 a roller 2a disposed at the start end of the conveyor and a roller 2b disposed at the discharge end of the conveyor are set at an angle of 90° in a plan view, on the conveyor body a which forms a frame of the conveyor system. Also, between these rollers 2a and 2b, an endless curved belt 1 is mounted to form an approximately circular carrying track in a plan view.

On the inner peripheral side of the curved belt 1 are mounted guide rollers 3a and 3b which support the inner peripheral edge section of the curved belt 1 from the inside of turning. And on the outer peripheral section of the curved belt 1 are mounted a driving roller 4 and pinch rollers 5 and 6. The curved belt is driven with its outer peripheral edge section held between the driving roller 4 and the pinch rollers 5 and 6, thus being driven in the direction of conveyance.

The rollers 2a and 2b include a number of small, short, cylindrical rollers 20 rotatably fitted along the outer periphery of shafts 21, being coaxially juxtaposed to form a long shaft-like roller of the same diameter throughout the entire length.

The shafts 21 thus supporting the rollers 2a and 2b are horizontally mounted and supported on support members 22, 22' and 23, 23' disposed in the outer peripheral section and the inner peripheral section of the conveyor body a, providing a 90° angle of opening between the axes of these shafts in a plan view. On the extensions of the outside diameters of the rollers 2a and 2b the turning center O of the curved belt 1 is positioned as shown in FIG. 1.

The small rollers 20 juxtaposed along the shaft 21 are so constituted as to rotate independently. That is, although the curved belt conveyor A1 runs at different peripheral speeds at the inner peripheral side and the outer peripheral side, the rollers 2a and 2b supporting both ends of the curved belt 1 are comprised of many small rollers 20 which are coaxially juxtaposed, so that the small rollers 20 rotate at a peripheral speed in their respective positions.

Furthermore, since the rollers 2a and 2b are made sufficiently small in outside shape, it is possible to substantially reduce a difference in level at a junction between the start end and discharge end of the curved belt conveyor A1 of the present invention and other conveyor. It is to be noted that the above-described rollers 2a and 2b can be changed to knife edges.

The curved belt 1 to be mounted between the rollers 2a and 2b is a doughnut-shaped sheet which can be developed into an approximately conical shape like an umbrella, and is mounted, in a two-fold state, between the rollers 2a and 2b, by inserting first the large-diameter outer peripheral section to thereby form a flat, approximately sectoral, circular carrying track in a plan view as shown in FIG. 1. The outer peripheral section of the curved belt 1 is formed flat and has no projecting bead and rail like in conventional curved belts.

Figure 2:
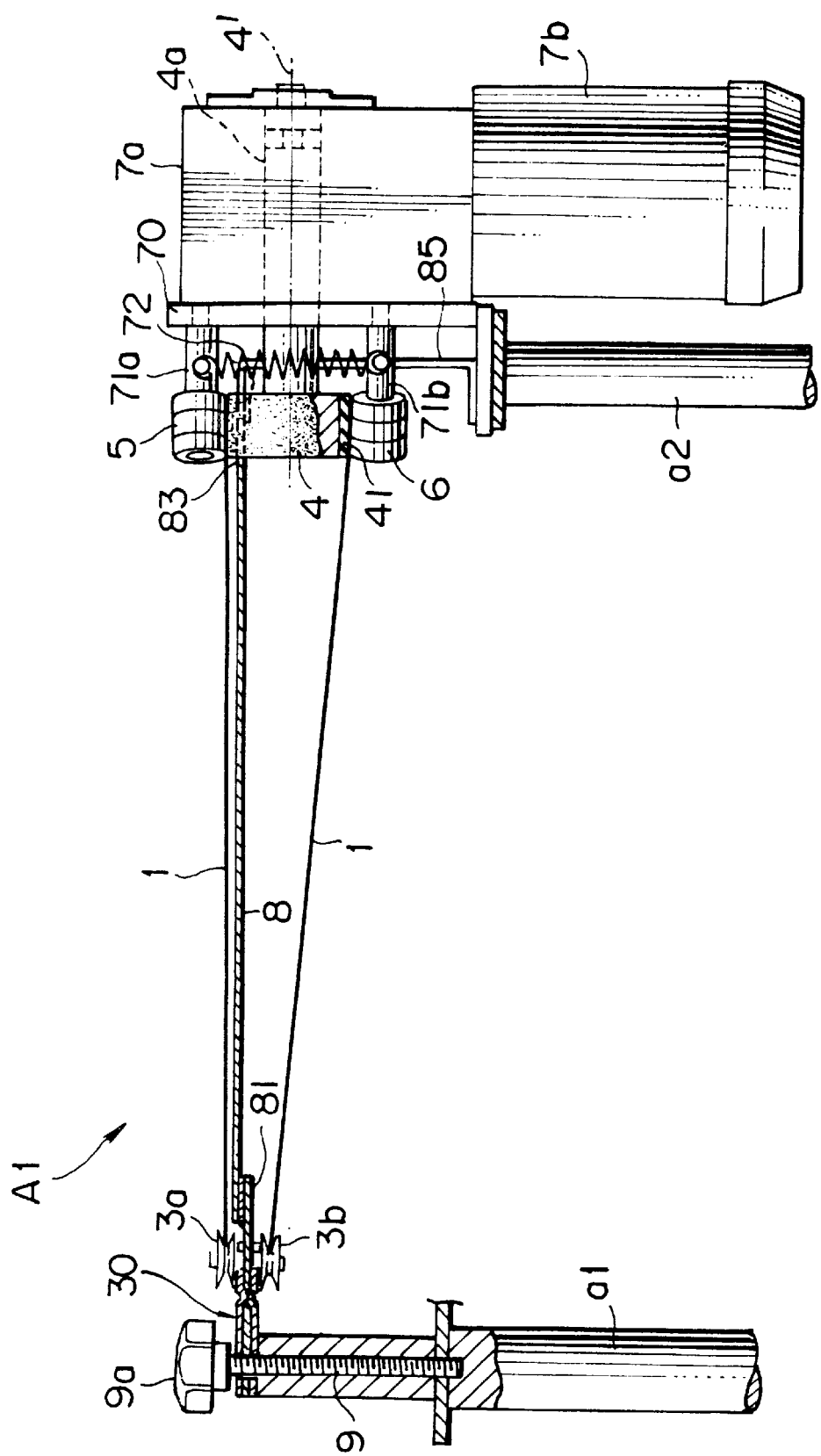
FIG. 2 is a sectional view taken along line II—II in FIG. 1.

The curved belt 1 mounted between the rollers 2a and 2b is supported on the forward run side from below by the horizontal and flat-surface base 8 as shown in FIG. 2.

The base 8 is of an approximately sectoral, circular shape similarly to the flat-surface curved belt 1. The base 8 is mounted and secured to conveyor body members a1 and a2 through a support member 81 on the inner peripheral side and support members 85 arranged at a spacing along the outer periphery of the conveyor, being set horizontally along the underside of the forward run side of the curved belt 1.

The base 8 supports level approximately the entire underside of the forward run side of the curved belt 1; the edge portions of both ends thereof being extended close to the rollers 2a and 2b.

Figure 4:
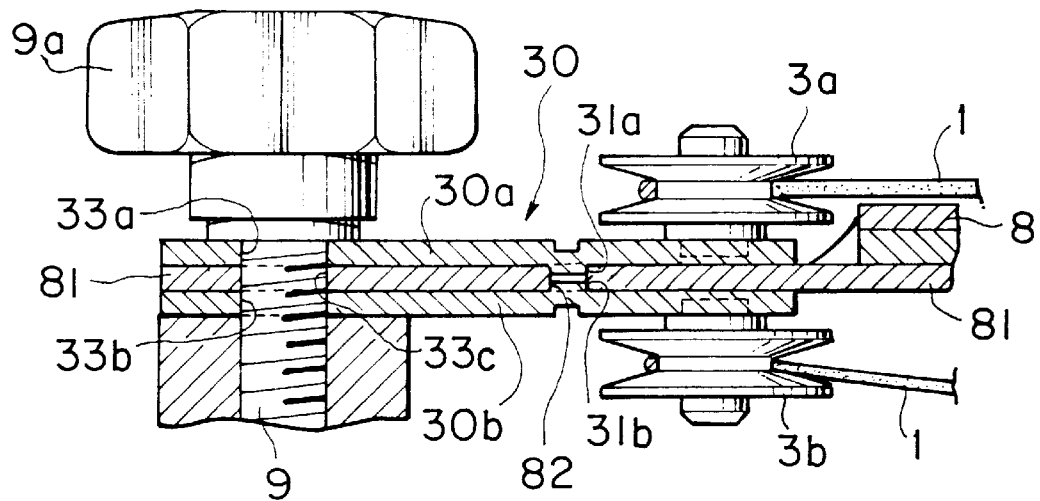
FIG. 4 is a sectional view taken along line IV—IV in FIG. 1.

Guide rollers 3a and 3b are provided in the inner peripheral section of the curved belt 1 to thereby support the inner peripheral edge of the curved belt 1 from the inside of turning as shown in FIGS. 2 and 4.

Figure 3:
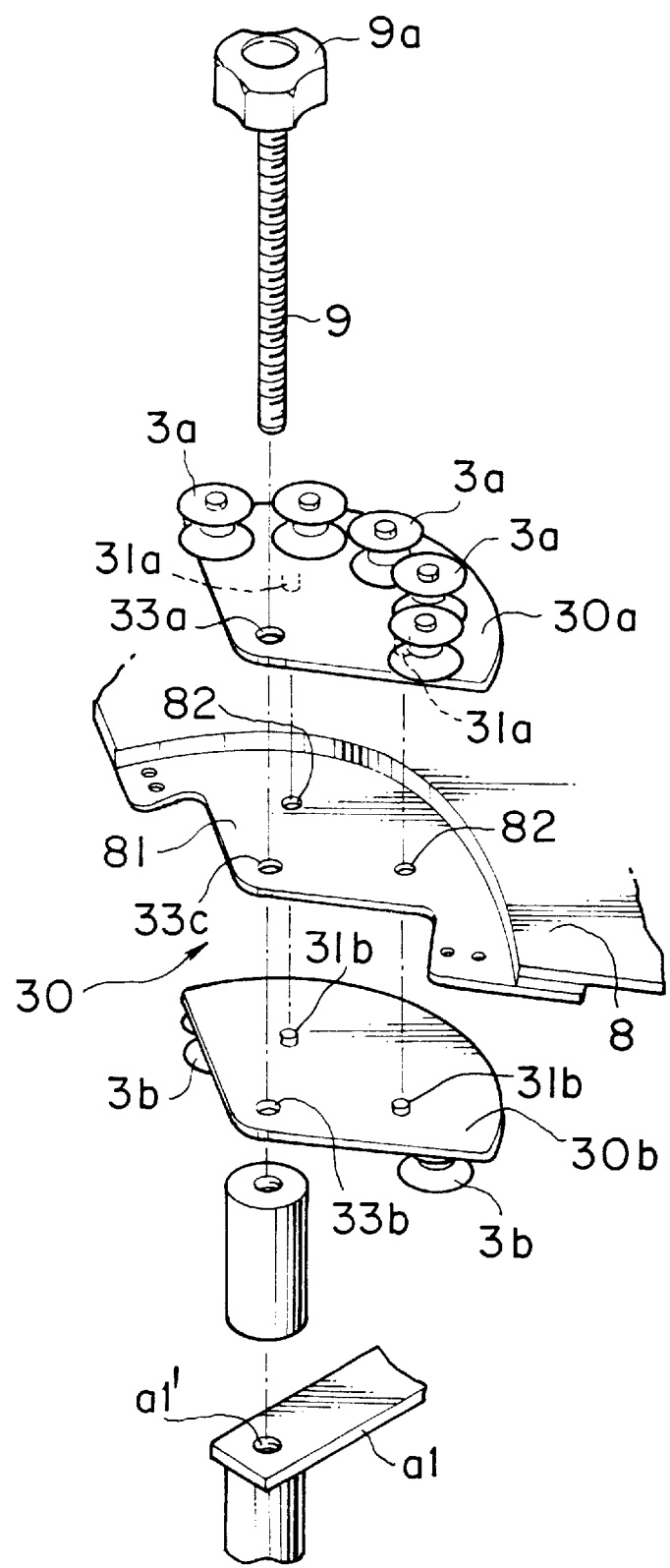
FIG. 3 is an exploded perspective view showing a guide roller section.

The guide rollers 3a and 3b serve to prevent the curved belt 1 mounted through between the rollers 2a and 2b from moving towards the inner peripheral side. A required quantity of guide rollers 3a and 3b, five each in the present embodiment, are removably mounted through the approximately sectoral base member 30, on the forward and return run sides of the inner peripheral section of the curved belt 1 as shown in FIG. 3. The quantity of the guide rollers 3a and 3b to be mounted may be arbitrarily changed.

The guide rollers 3a and 3b, as shown in FIG. 4, are pulley-shaped rollers provided with a V-slot along the outer periphery, and mounted and supported with respect to the base member 30 formed in an approximately sectoral shape.

The base member 30 comprises a base plate 30a for supporting the guide roller 3a on the forward run side and a base plate 30b for supporting the guide roller 3b on the return run side; along either of the base plates 30a and 30b, five guide rollers 3a and five guide rollers 3b are axially supported at a predetermined spacing along the circumference of the base plates 30a and 30b, so that when the base plates 30a and 30b are mounted, the guide rollers 3a and 3b come into contact, from the inside of turning, with the forward run side and the return run side, at the inner peripheral edge of the curved belt 1.

On the back side of the base plates 30a and 30b two projections 31a and 31b protrude at a predetermined spacing. With the base plates 30a and 30b mounted on both sides of the support member 81 attached on the inner peripheral section of the base 8, the projections 31a and 31b fit in positioning holes 82 provided in the support member 81 to thereby properly position the base plates 30a and 30b in position as shown in FIG. 3.

Furthermore, the base plates 30a and 30b have screw holes 33a and 33b which register with insertion holes 33c provided in the support member 81 when mounted on both sides of the support member 81. Then, a bolt 9 with a handle 9a is inserted into either of the screw holes 33a and 33b which are vertically aligned with the insertion hole 33c. The bolt 9 is tightened with the end screwed into the screw hole a1' of the body member a1 protrusively provided on the inner peripheral side of turning, thus tightening the base plates 30a and 30b together in the predetermined position and securing the support member 81 on the inner peripheral side of the base 8 to the body member a1.

The base plates 30a and 30b and the support member 81 are threadedly tightened together, as described above, into the body member a1 by using the mounting bolt 9 with the handle 9a, being properly positioned in a predetermined position on the inner peripheral side of turning. Thus, the guide rollers 3a and 3b mounted and supported on the base plates 30a and 30b come into contact, from the inside of turning, with the forward run side and the return run side at the inner peripheral edge of the curved belt as shown in FIG. 4.

When the guide rollers 3a and 3b are in a mounted state, the curved belt 1 is supported on both the forward run side and the return run side from the inside of turning by means of the guide rollers 3a and 3b respectively as described above. With the rotation of the curved belt 1, therefore, the guide rollers 3a and 3b function to keep the curved belt 1 from moving away toward the inside of turning so that the curved belt 1 will constantly run in the specific position on the rollers 2a and 2b.

The curved belt 1 mounted as described above can be removed by drawing toward the inside of turning after the removal of all the guide rollers 3a and 3b together with the base plates 30a and 30b with the mounting bolt 9 removed. That is, the curved belt 1 can be easily removed simply by removing the one mounting bolt 9.

In the meantime, the driving roller 4 is mounted on the outer peripheral side of the curved belt 1.

The driving roller 4, rotating in contact with the outer peripheral section of the curved belt 1 mounted as described above, is for turning the curved belt. The driving roller 4 is rotatably supported in such a state that the axial center 4' is aligned with the reference line L extending toward the outer periphery of the curved belt 1 from the turning center O of the curved belt 1 as shown in FIG. 1.

The driving roller 4 is located at the center of the outer periphery of the curved belt 1 where the reference line L passes through, and is supported with the axial center 4' horizontally inserted between the forward run side and the return run side of the curved belt 1 as shown in FIG. 2.

The driving roller 4 is a cylindrical member fitted with a non-slip member 41 on the outer periphery, and is mounted on one end of the shaft 4a. The driving roller 4 is inserted in the opening of the outer peripheral section of the curved belt 1, and the shaft 4a horizontally protruding toward the outside of the curved belt 1 is inserted and rotatably supported by in a gearbox 7a.

The driving roller 4 thus mounted is in contact with the inside surface on the forward run side of the curved belt 1 sliding along the base 8, with the uppermost portion of the outer peripheral surface protruded slightly out of the opening 83 which is provided in the outer peripheral section of the base 8 as shown in FIG. 2.

The gearbox 7a is securely mounted on a mounting base plate 70 which is vertically set on the conveyor body member a2. The shaft 4a of the driving roller 4 is rotated at a predetermined speed by a driving motor 7b mounted in the lower part of the gearbox 7a.

The pinch roller 5 and the pinch roller 6 are mounted immediately above the forward run surface and immediately below the return run surface of the curved belt 1 corresponding to the mounting positions of the driving roller 4. Between the pinch rollers 5 and 6 and the outer peripheral surface of the driving roller 4, the outer peripheral section on the forward run side and the outer peripheral section on the return run side are held.

The pinch rollers 5 and 6 are freely rotatably mounted on the outer periphery side of the shafts 5a and 6a through the support 51.

The pinch rollers 5 and 6 are supported at the shafts 5a and 6a by the rotating arms 71a and 71b.

Figure 5:
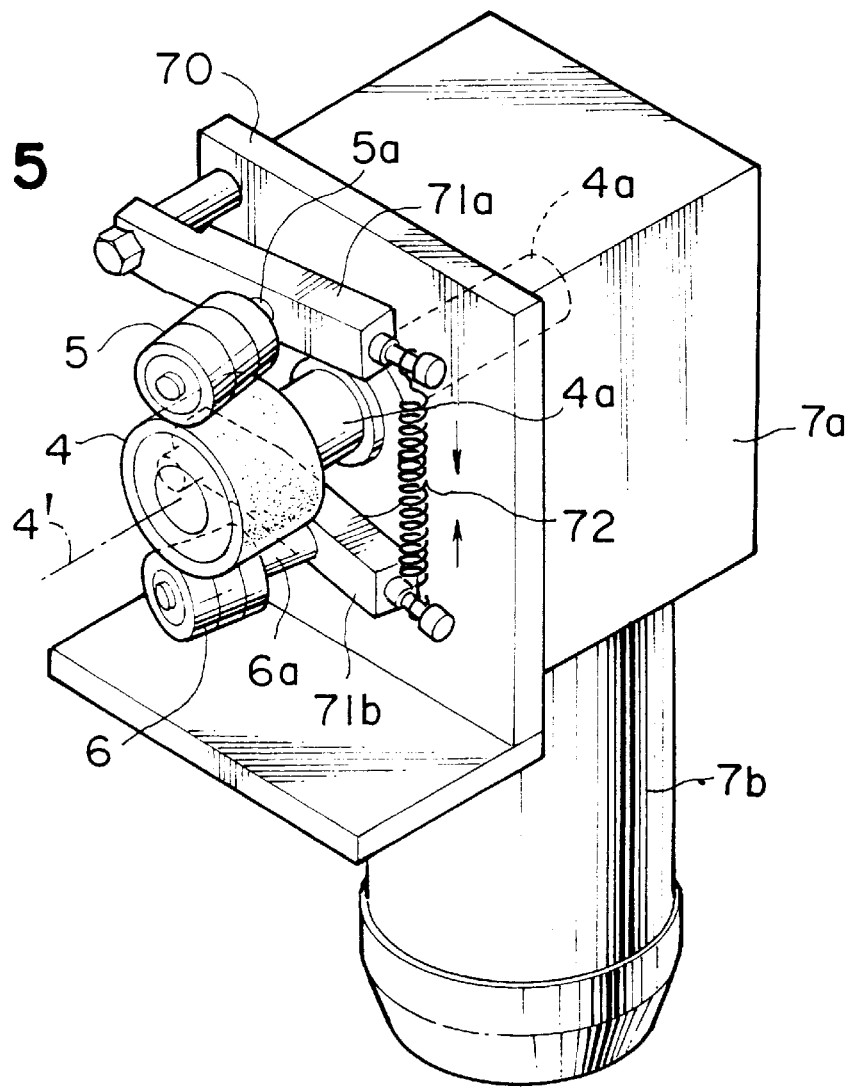
FIG. 5 is a perspective view showing a driving roller and a pinch roller.
Figure 6:
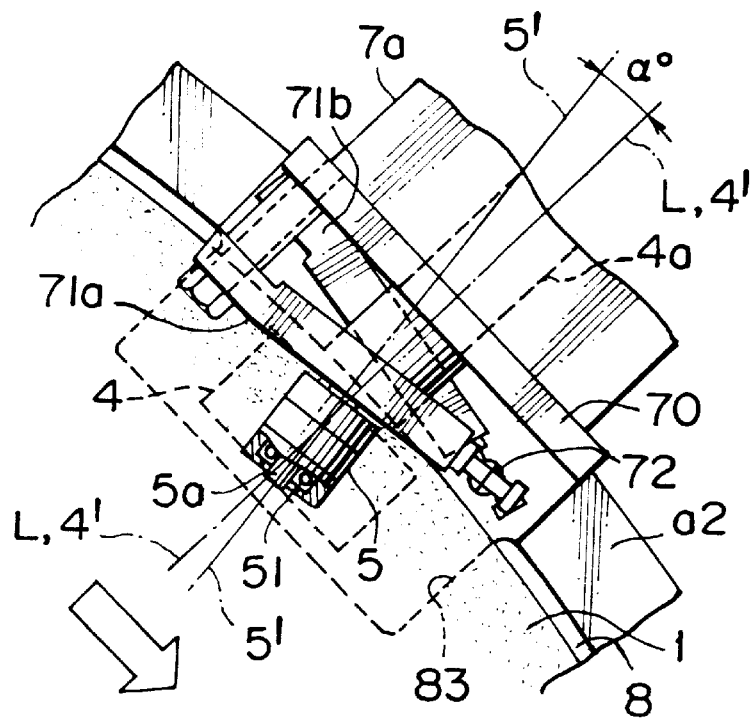
FIG. 6 is a plan view showing a pinch roller section on the forward run side.

The rotating arm 71a on the forward run side is pivotally mounted at one end on the mounting base 70 of the gearbox 7a, so that the other end of the arm 71a can move up and down. Also, the shaft 5a of the pinch roller 5 is horizontally secured to the intermediate section of the rotating arm 71a; and the shaft 5a and the pinch roller 5 are horizontally protruded from the rotating arm 71a; the pinch roller 5 being supported to be positioned immediately above the driving roller 4 as shown in FIGS. 5 and 6.

In the meantime, one end of the rotating arm 71b on the return run side is pivotally attached beneath the driving roller 4 in the mounting base 70, being supported so as to make rotation similarly to the rotating arm 71a. Then, the shaft 6a of the pinch roller 6 is securely attached in the intermediate section of the rotating arm 71b, so that the shaft 6a and the pinch roller 6 will protrude horizontally from the rotating arm 71b and the pinch roller 6 is supported to be positioned immediately below the driving roller 4.

Between the forward ends of both rotating arms 71a and 71b supported as described above a coil spring 72 is mounted, by the force of which the forward ends of the rotating arms 71a and 71b are brought close to each other, thereby constantly pressing the pinch rollers 5 and 6 pivotally supported in the intermediate section of the rotating arms 71a and 71b against the outer peripheral surface of the driving roller 4.

That is, the pinch rollers 5 and 6 pulled by the coil spring 72 as described above, pressing both the outer peripheral section on the forward run side and on the return run side of the curved belt 1, are pressed against the outer peripheral surface of the driving roller 4.

The pressure of the pinch rollers 5 and 6 to be applied to the driving roller 4 can be adjusted by replacing the coil spring 72 itself or by changing the extension stroke of the coil by means of an adjusting screw.

Therefore, when the driving roller 4 is driven to rotate in the normal direction, the forward run side of the curved belt 1 which is in contact with the outer periphery of the driving roller 4 turns from the start end towards the discharge end, and at the same time the return run side of the curved belt 1 turns from the discharge end towards the start end of the conveyor. Also at the same time, the pinch rollers 5 and 6 which are in contact with the forward and return run sides of the curved belt 1 rotate with the turning of the curved belt 1.

The pinch rollers 5 and 6 on both the forward and return run sides are rotatably supported, with the axes 5' and 6' of the pinch rollers 5 and 6 inclined to a predetermined direction with respect to the reference line L in a plan view. Thus the outer peripheral section of the curved belt 1 rotating as described above is pressed towards the outside of turning.

Figure 7:
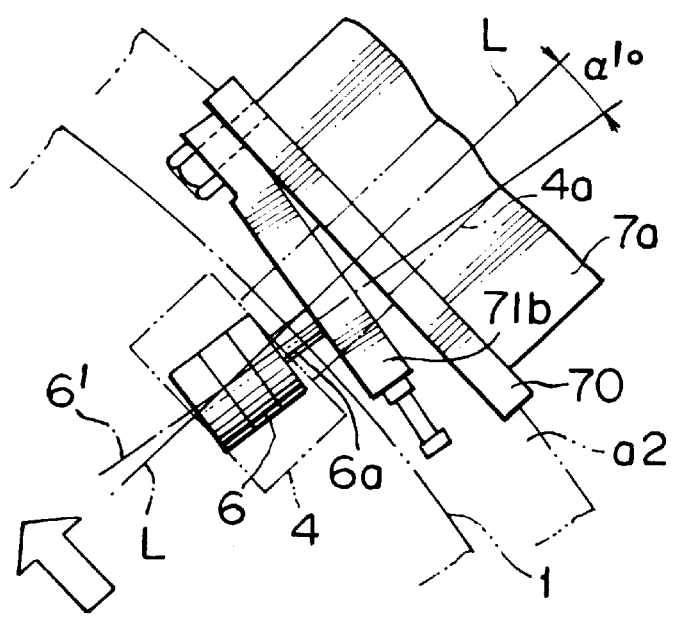
FIG. 7 is a plan view showing a pinch roller section on the return run side.

The rotating arms 71a and 71b supporting the pinch rollers 5 and 6 are bent to an approximately L shape at the shaft support of one end portion, inclining the axes 5' and 6' of the pinch rollers 5 and 6 to a predetermined direction as shown in FIGS. 6 and 7.

As shown in FIG. 6 (a plan view), the rotating arm 71a on the forward run side is supported, with the axial center 5' of the pinch roller 5 inclined by $\alpha°$ in relation to the reference line L, by bending the discharge end side towards the outside of the curved belt 1. The axial center 5' of the pinch roller 5 in the present embodiment is inclined forward at the inclination angle $\alpha°$ of 7.5° with the forward end of the shaft 5a on the inside of turning directed towards the discharge end of the conveyor.

As shown in FIG. 7 (a plan view), the rotating arm 71b on the return run side is supported, with the axial center 6' of the pinch roller 6 inclined by $\alpha°$ in relation to the reference line L, by bending the discharge end side of the conveyor towards the outside of the curved belt 1. The axial center 6' of the pinch roller 6 in the present embodiment is inclined forward at the inclination angle $\alpha°$ of 7.5°, similarly to the pinch roller 5 on the forward run side, with the forward end of the shaft 6a on the inside of turning directed towards the start end of the conveyor.

Next, the dynamic balance in each part of the curved belt conveyor system with the curved belt 1 running will be described with reference to FIG. 8 and FIG. 9.

The curved belt conveyor A1 of the above-described constitution is of such a design that when the driving roller 4 is driven, the forward run side of the curved belt 1 which is in contact with the upper outer peripheral section of the driving roller 4 move from the start end of the conveyor toward the discharge end of the conveyor, and at the same time the return run side of the curved belt 1 which is in contact with the lower outer peripheral section of the driving roller 4 moves from the discharge end of the conveyor towards the start end of the conveyor, with the result that the curved belt 1 mounted between the rollers 2a and 2b turns in the normal direction.

Figure 8:
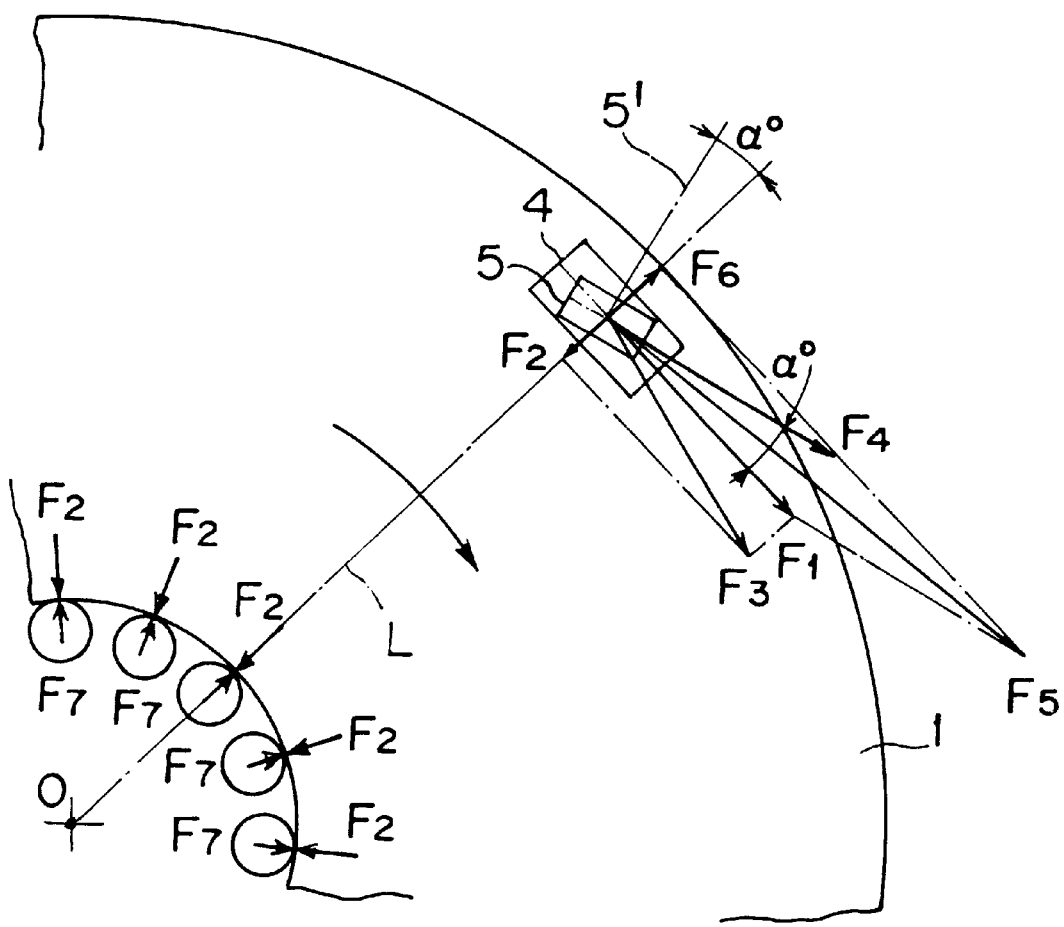
FIG. 8 is an explanatory view showing dynamic balance of each part on the forward run side.

In FIG. 8, as the curved belt 1 turns in the normal direction with the rotation of the driving roller 4, the pinch roller 5 on the forward run side rotating in contact with the curved belt 1 produces a contact force F4 to push the outer peripheral section of the curved belt 1 towards the outside of turning because the axial center 5' of the pinch roller 5 is inclined to the inclination angle $\alpha°$.

The contact force F4 is combined with the driving force F1 of the driving roller 4 acting in the tangential direction of the curved belt 1, functioning as a resultant force F5. The resultant force F5 turns the curved belt 1 in the normal direction, and works as a force F6 for pulling the outer peripheral section of the curved belt 1 towards the outside of turning.

The curved belt 1 is driven by the driving force F1. At the same time, the force F2 also acts to move the curved belt 1 away towards the inside of turning. Therefore the curved belt 1 tends to move in the direction of the resultant force 3 of F1 and F2. Movement in the direction of the resultant force F3 means travel of the curved belt 1 in a zigzag direction, which will disturb smooth turning of the conveyor and furthermore shorten belt life.

Therefore, to receive the force F2 acting to move the forward run side of the curve belt 1 towards the inside of turning, the guide roller 3a is mounted along the inner peripheral edge of the curved belt 1, thus preventing the curved belt 1 from moving towards the inside of the turning.

Figure 9:
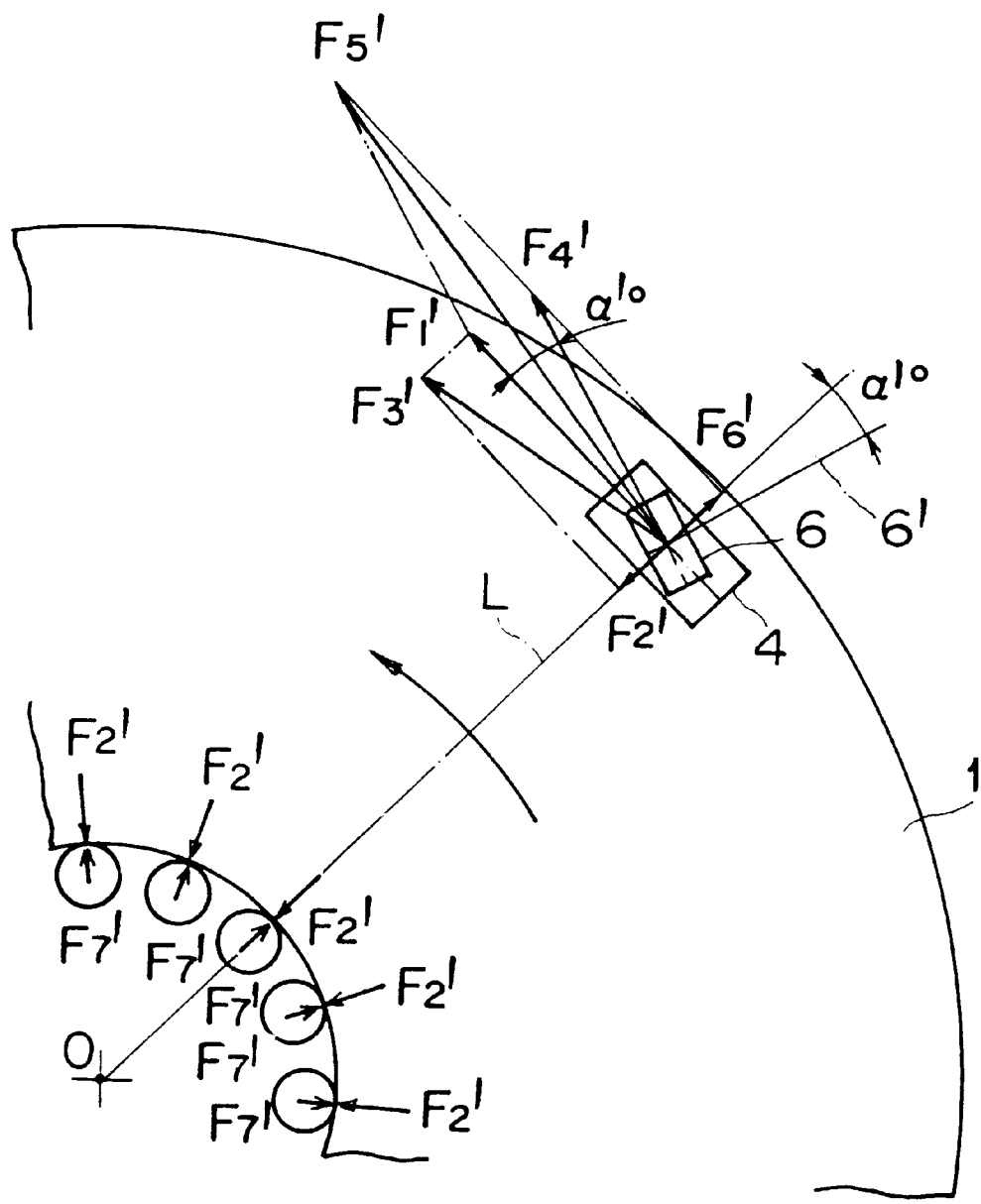
FIG. 9 is an explanatory view showing dynamic balance of each part on the return run side.

In the meantime, as shown in FIG. 9, since the axial center 6' is inclined to the inclination angle α°, the pinch roller 6 on the return run side which rotates in contact with the curved belt 1 turning in the normal direction produces a contact force F4' for pushing the outer peripheral section of the curved belt 1 towards the outside of turning.

The contact force F4' is added with the driving force F1' of the driving roller 4 which acts in the tangential direction of the curved belt 1, working as a resultant force F5'. The resultant force F5' turns the curved belt 1 in the normal direction, and also acts as a force F6' for pulling the outer peripheral section of the curved belt 1 towards the outside of turning.

That is, the force is exerted similarly to both the forward and the return run side of the curved belt 1.

Furthermore, the force F2' for moving the return run side of the curved belt 1 towards the inside of turning also acts on the guide rollers 3b mounted along the inner peripheral edge of the return run side of the curved belt 1, thereby preventing the curved belt 1 from shifting towards the inside of turning similarly to the above-described.

That is, as described above, the reaction forces F7 and F7' of the forces F2 and F2' act on the portion where the guide rollers 3a and 3b are in contact with the inner peripheral edge of the curved belt 1. When F2=F7 and F2'=F7', the curved belt 1 runs with stability.

However, the rigidity in the direction of width of the curved belt 1 cannot withstand the reaction force F7 of F2, with the result that there will occur such a symptom of deformation as bulging at the central part on the forward run side of the curved belt 1.

In the curved belt conveyor A1 of the present invention, a lack of the rigidity of the curved belt 1 is made up with the forces F6 and F6' for pulling the curved belt 1 towards the outside of turning by the contact forces F4 and F4' of the pinch rollers 5 and 6, thereby satisfying the conditions of F2≦F6+F7 and F2'≦F6'+F7' to realize stabilized running of the curved belt conveyor A1.

In the driving mechanism using the gearbox 7a and the driving motor 7b of the driving roller 4 as in the above-described embodiment of the present invention, the gearbox and the driving motor protrude largely out of the outer peripheral section of the conveyor body member a2. Therefore, the driving mechanism of the driving roller 4 may be constituted as shown in FIG. 10.

Figure 10:
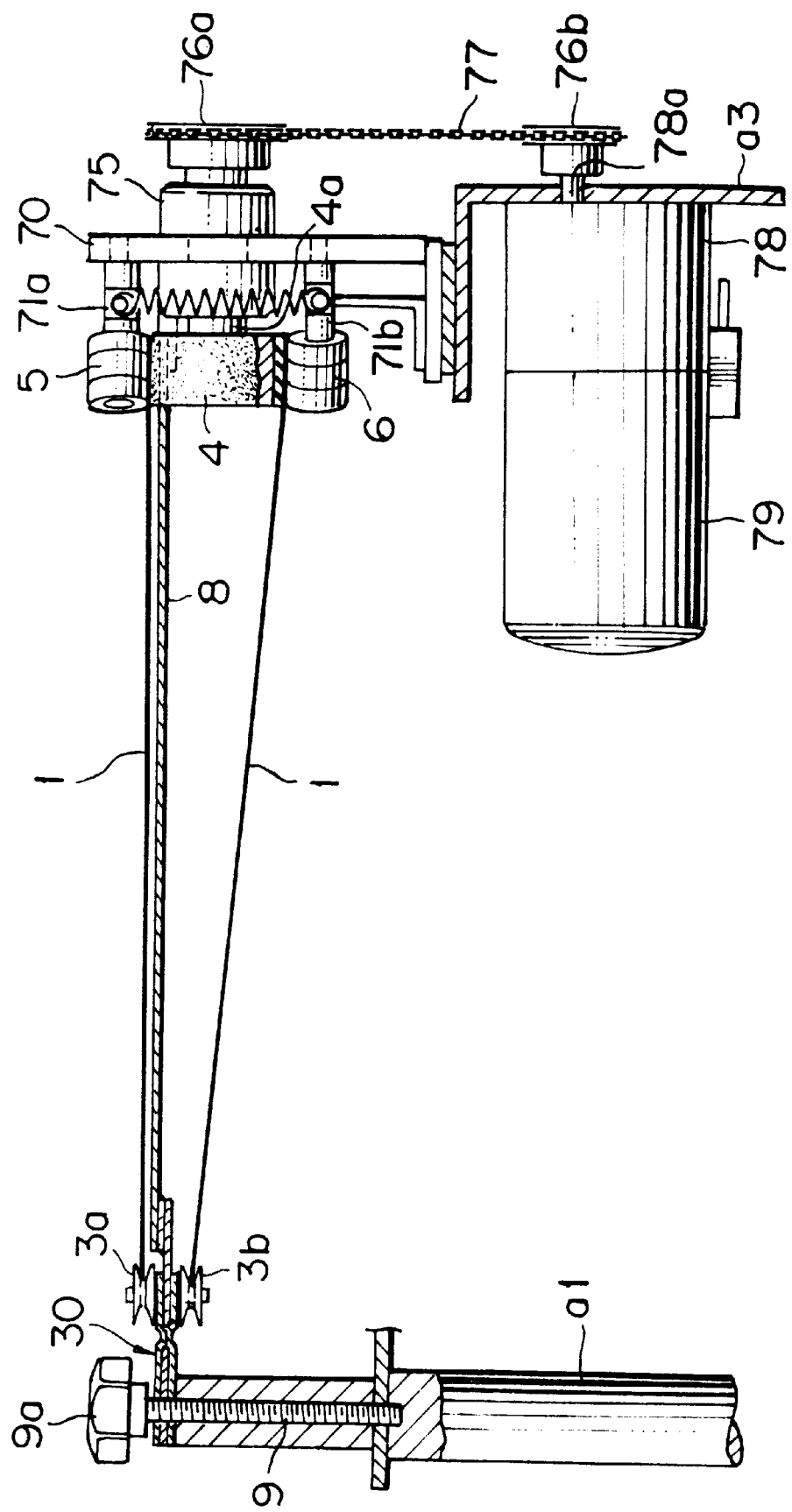
FIG. 10 is a longitudinal sectional view of the curved belt conveyor in which the driving roller and the driving motor are connected by the use of a chain.

In the driving mechanism shown in FIG. 10 the shaft 4a of the driving roller 4 is inserted into a support 75 mounted on the mounting base plate 70, being connected to a sprocket 76a which is supported, protruding out of the support retainer 75.

In the meantime, on the conveyor body member a3 immediately below the driving roller 4 are mounted a driving motor 79 and a gearbox 78; and a sprocket 76b is mounted on an output shaft 78a projecting from the gearbox 78. The sprocket 76a and 76b are connected by an endless chain 77, to thereby transmit the driving power of the driving motor 79 to the driving roller 4.

According to the driving mechanism of the above-described constitution, it is possible to substantially decrease the length of projection of the output shaft 78a from the conveyor body member a3 to narrow the mounting space of the equipment. In the present embodiment of the present invention, the endless chain is adopted for driving power transmission, but the power transmitting means is not limited to the chain and may be an endless belt, gears, etc.

Figure 11:
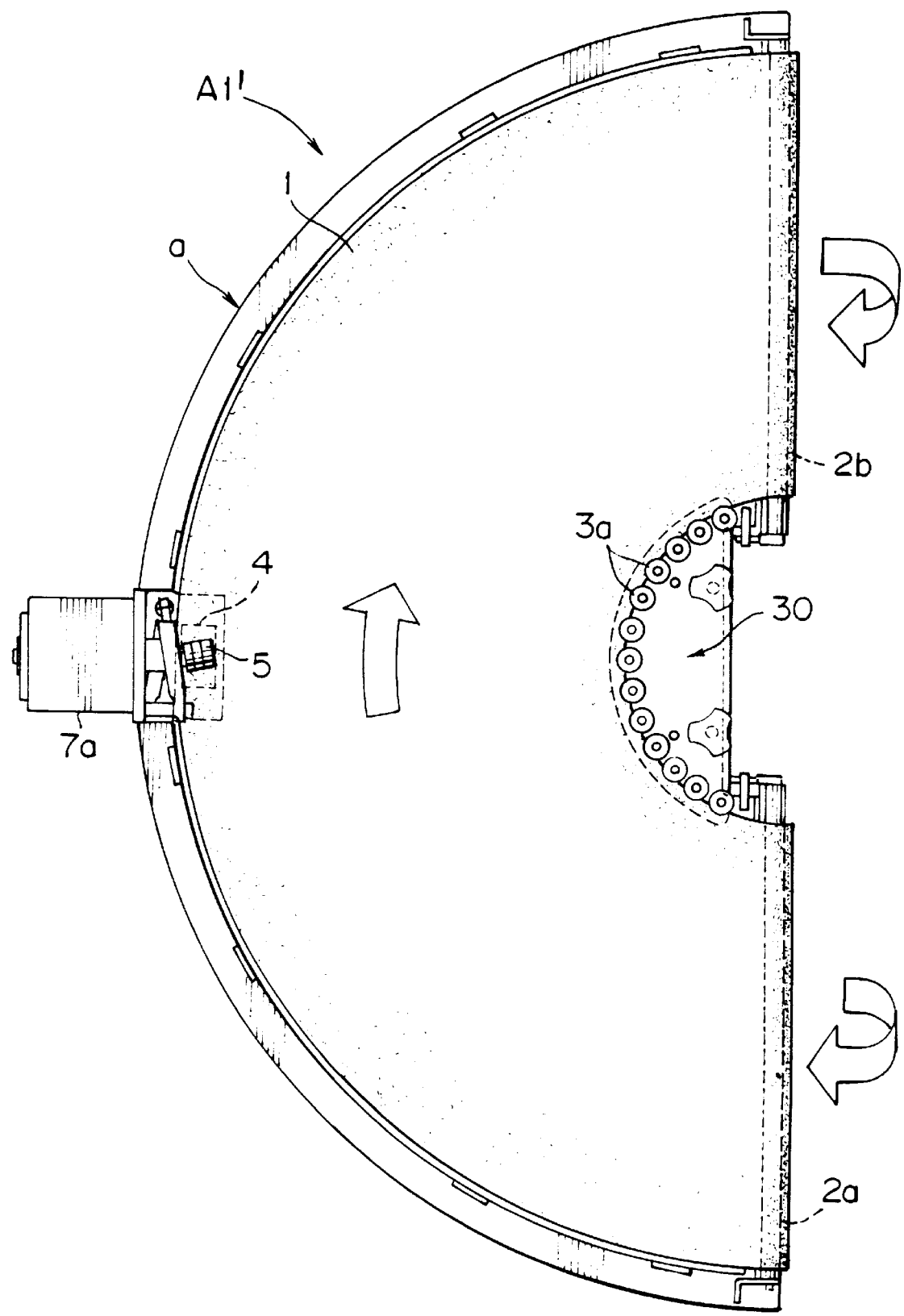
FIG. 11 is a plan view showing a 180° turning curved belt conveyor.

Furthermore, in the curved belt conveyor A1 of the embodiment of the present invention, the rollers 2a and 2b at both ends of the conveyor are mounted at an angle of 90°. In the curved belt conveyor of the present invention, however, the angle is not limited to 90°, and may be set either at 90° or less or more. For example, as in the case of the curved belt conveyor A1' shown in FIG. 11, the roller 2a at the start end of the conveyor and the roller 2b at the discharge end of the conveyor may be arranged at the angle of 180°.

Next, an embodiment of the present invention of the curved belt conveyor according to claims 2 to 4 will be explained.

The curved belt conveyor A2 shown in FIG. 12 to FIGS. 20A and B carries loads on a circular turning track from the feed end to the discharge end of the conveyor in a direction intersecting the direction of feed.

The curved belt conveyor A2 can be driven in a reverse direction by operating a later-described changeover lever 210. In this case, reversely to the normal operation, the loads brought onto the other end of the conveyor can be carried to one end of the conveyor.

In the curved belt conveyor A2, similarly to the curved belt conveyor A1 shown in FIG. 1 and FIG. 2, roller 202a are disposed on one end of the conveyor, including a number of small rollers 220 coaxially juxtaposed on the conveyor body 200a which forms the frame of the conveyor system and rollers 202b on the other end of the conveyor. The rollers 202a and 202b are arranged at an angle of 90° in a plan view. Between these rollers 202a and 202b an endless curved belt 201 is mounted to form an approximately circular carrying track in a plan view.

The one end of the curved belt conveyor A2 is the side on which the rollers 202a are arranged, while the other end is the side on which the rollers 202b are arranged. The normal operation of the curved belt conveyor A2 is the operation to carry loads from the roller 202a side towards the roller 202b side, and the reverse operation is the operation to carry the loads in the reverse direction.

The rollers 202a and 202b comprise a number of small, short, cylindrical rollers 220, which are rotatably mounted on the outer periphery of the shaft 221, forming a long shaft-shaped roller of the same diameter over the entire length.

The shafts 222 are mounted horizontally, at an angle of 90° in a plan view between the axes thereof, on which the rollers 202a and 202b are axially arranged and supported by support members 222, 222' and 223, 223' provided on the outer periphery side and the inner periphery side.

The small rollers 220 juxtaposed along the support shaft 221 as described above are each constituted to rotate independently, at a peripheral speed in each of their positions, in order to properly correspond to different peripheral speeds between the inner periphery and the outer periphery of the curved belt 201. The rollers 202a and 202b may be replaced with knife edges.

Figure 12:
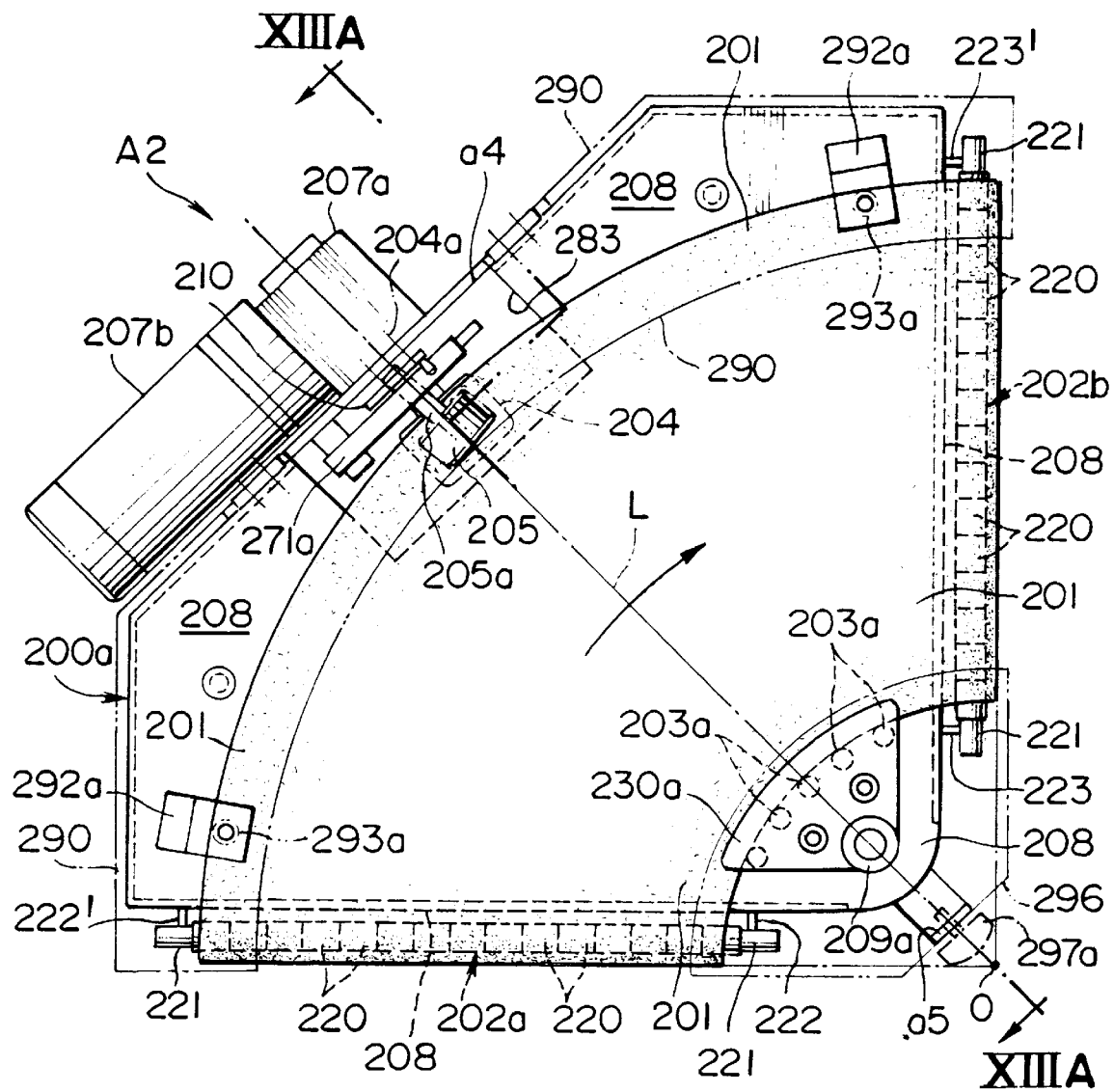
FIG. 12 is a plan view showing an embodiment of the present invention of the curved belt conveyor according to claim 2.

Between the rollers 202a and 202b is fitted the curved belt 201 similar to the curved belt 1 of the curved belt conveyor A1 previously stated, thereby forming an approximately sectoral, circular carrying track in a plan view of FIG. 12. The curved belt 201 is formed flat at the outer peripheral section, having no projection such as beads and rails in conventional curved belts.

On the inner peripheral side of the curved belt 201 are provided guide rollers 203a and 203b for supporting the inner peripheral edge of the curved belt 201 from the inside of turning. Also in the outer peripheral section of the curved belt 201 are arranged the driving roller 204 and the pinch rollers 205 and 206. With the outer peripheral edge of the curved belt inserted between the driving roller 204 and the pinch rollers 205 and 206, the driving roller 204 is driven to drive the curved belt 201 in the normal and reverse directions as shown in FIG. 12. That is, the rollers 202a and 202b, the curved belt 201, and the base plate 208 which are basic components of the curved belt conveyor are constituted similarly to those of the curved belt conveyor A1.

The curved belt 201 mounted between the rollers 202a and 202b is supported on the forward run side, from below by a horizontal, flat-surface base 208 as shown in FIG. 13A and FIG. 13B.

The base 208 is an approximately sectoral type little smaller than the aforesaid flat-surface base of the curved belt 201. The base 208 is mounted and supported between the support member a5 protruding on the inner peripheral side of the conveyor body 200a and the mounting base plate a4 at the outer peripheral section of the conveyor body 200a, being set level so as to support the forward run surface of the curved belt 201 from below. The edge of either end of the base 208 reaches a position immediately before the rollers 202a and 202b.

Figure 14:
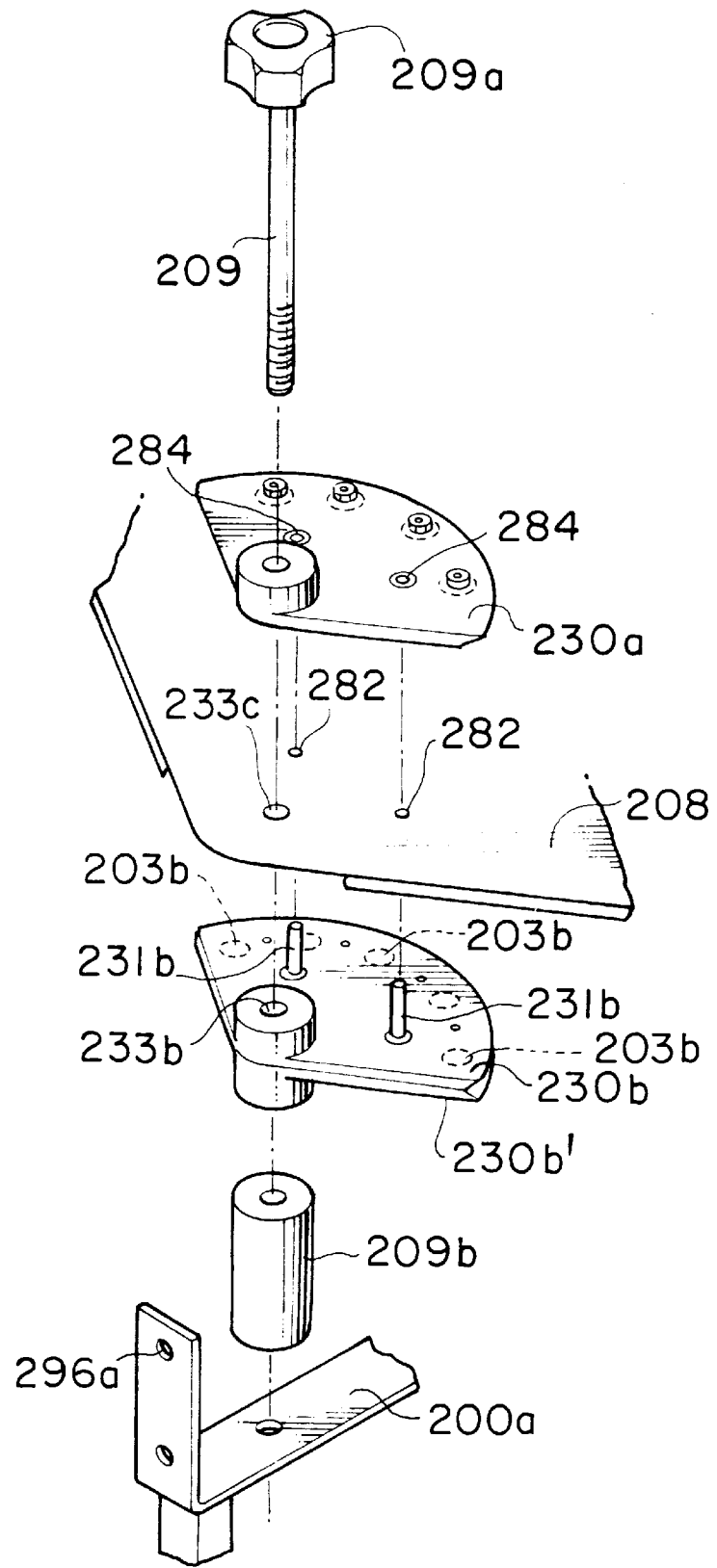
FIG. 14 is an exploded perspective view showing a guide roller section.

In the inner peripheral section of the curved belt 201 are mounted the guide rollers 203a and 203b similarly to the curved belt conveyor A1 shown in FIGS. 1 and 2, to support the inner peripheral edge of the curved belt 201 from the inside of turning as shown in FIG. 13A, FIG. 13B, and FIG. 14.

The guide rollers 203a and 203b consist of supports; the guide rollers 203a on the forward run side are fitted and supported at a predetermined spacing along the outer peripheral section of the underside of the base plate 230a formed in approximately sectoral shape.

In the meantime, the guide rollers 203b on the return run side are rotatably supported between two approximately sectoral base plates 230b and 230b'. Therefore, with the base plates 230a, 230b, and 230b' set, the guide rollers 203a and 203b are so constituted as to contact, from the inside of turning, the forward run side and the return run side at the inner peripheral edge of the curved belt 201.

In the base plates 230b and 230b', a couple of positioning pins 231 are inserted through to protrude up to the upper surface side; and these positioning pins 231b are inserted in through holes 282 provided in the inner peripheral section of the base 208, protruding out to the upper surface of the base 208.

In the meantime, the base plate 230a on the upper surface side is provided with two positioning holes 284 into which positioning pins 231b projecting to the upper surface of the inner peripheral section of the base 208 as described above are inserted. Then, with the inner peripheral section of the base 208 interposed between the base plate 230a and the base plate 230b, 230b', the positioning pin 231b is inserted into the positioning hole 282 provided in the base 208 and further into the positioning hole 284 of the base plate 230a, thereby mounting the base plates 230a, 230b, and 230b' and the base 208 are mounted respectively in predetermined related positions as shown in FIG. 13A, FIG. 13B, and FIG. 14.

The outer peripheral edge section of the base plates 230a, 230b, 230b' stated above is tapered in a sectional form. With the base plates 230a, 230b, and 230b' installed, there is formed a slot of approximately V section between the outer peripheral edge of the base 230a and the upper surface of the base 208, and between the outer peripheral edges of the base plates 230b and 230b on the lower surface side. In this slot the inner peripheral edge of the curved belt 201 is inserted as shown in FIG. 13A and FIG. 13B.

In the base plates 230a, 230b, and 230b', the positioning pin 231b is inserted to set the base plates 230a, 230b, and 230b' and the base 208 in a predetermined position. In this state, the bolt hole 233c provided near the corner of the base 208 and the bolt holes 233a and 233b match up.

Then, a mounting bolt 209 with a handle 209a is inserted in the bolt holes 233a and 233b aligned with the insertion hole 233c of the base 208. Furthermore, the mounting bolt 209 is inserted into a spacer 209b, and is threadedly tightened into the bottom surface section of the conveyor body 200a, thereby tightening the base plates 230a, 230b, and 230b' together in a predetermined position. Also, the inner peripheral side of the base 208 is mounted and secured on the conveyor body 200a.

The base 208 and the base plates 230a, 230b, and 230b' thus mounted in register as described above are tightened to the conveyor body 200a by the mounting bolt 209 having the handle 209a, thereby properly setting the base plates 230a, 230b and 230b' in the predetermined position on the inner peripheral side of turning. Then, the guide rollers 203a and 203b provided on the base plate 230a and 230b come into contact, from the inside of turning, with the inner peripheral edge of the curved belt 201 on the forward and return run sides as shown in FIG. 13A and FIG. 13B. That is, the guide rollers 203a and 203b function entirely in the same manner as the guide rollers 3a and 3b of the curved belt conveyor A1 shown in FIG. 1 and FIG. 2.

The curved belt 201 mounted as described above can be drawn out towards the inside of turning by loosening the mounting bolt mounting bolt 209 and removing the base plates 230a, 230b, and 230b' provided with the guide rollers 203a and 203b. That is, the curved belt 201 can be easily removed simply by removing the single mounting bolt 209.

In the meantime, the driving roller 204 is disposed on the outer peripheral side of the curved belt 201. The driving roller 204 is rotatably supported with its axial center 204' aligned with the reference line L extended from the turning center O of the curved belt 201 towards the outer periphery of the curved belt 201 as shown in FIG. 12, FIG. 18B.

The driving roller 204 is mounted with the axial center 204' aligned with the center of the outer periphery of the curved belt 201 where the reference line L in a plan view passes through, and, in this state, is inserted and supported with the axial center 204' set horizontally between the forward run side and the return run side of the curved belt 201 as shown in FIG. 12 and FIG. 13A.

The driving roller 204 is inserted into the opening in the outer peripheral section of the curved belt 201, and the support shaft 204a horizontally projecting towards the outside of the curved belt 201 is mounted into the mounting base plate a4 of the conveyor body 200a. Then, the driving roller 204 is inserted into the gearbox 207a set on the back side of the mounting base plate a4, for connection to an unillustrated output shaft of the gearbox 207a. In this state, the driving roller 204 is supported to be drivable in both normal and reverse directions.

The driving roller 204, protruded at the uppermost portion of the outer peripheral surface slightly out of an opening 283 provided in the outer peripheral section of the base 208, is so set as to contact the inner surface on the forward run side of the curved belt 201 which slides along the base 208 as shown in FIG. 13A.

The gearbox 207a is securely mounted on the mounting base plate a4 erected on the conveyor body 200a, and is driven by the driving motor 207b mounted beside it, thereby driving the support shaft 204a of the driving roller 204 at a specific speed of rotation in normal and reverse directions.

Immediately above the forward run surface and immediately below the return run surface of the curved belt 201 corresponding to the location of the driving roller 204, the pinch roller 205 and the pinch roller 206 are mounted. Between the pinch rollers 205 and 206 and the outer peripheral surface of the driving roller 204, the outer peripheral section of the forward run side and the outer peripheral section of the return run side of the curved belt 201 are held as shown in FIG. 13A and FIG. 15.

Figure 15:
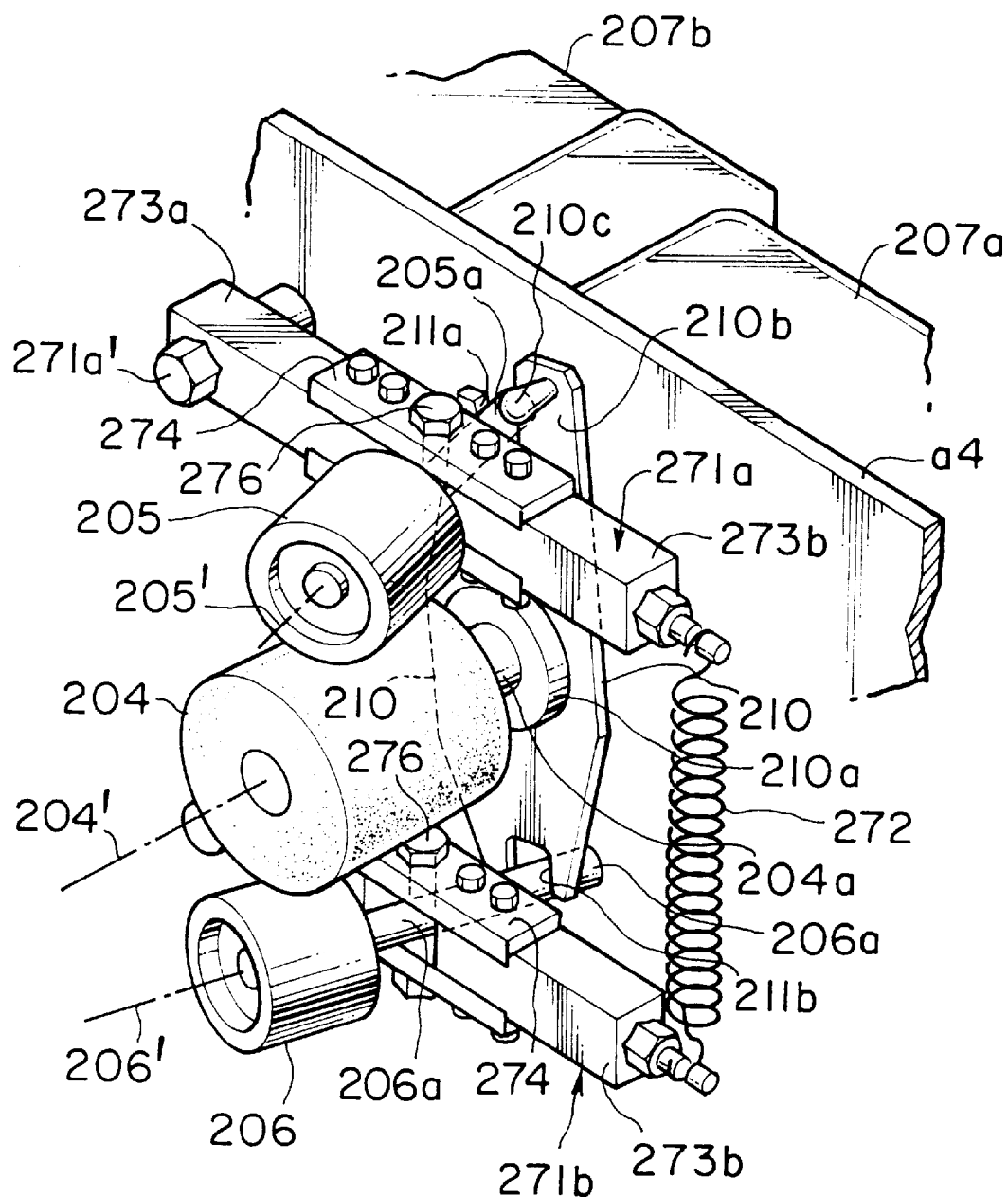
FIG. 15 is a perspective view showing the driving roller and a pinch roller section.

The support shafts 205a and 206a of the pinch rollers 205 and 206 are supported by rotating arms 271a and 271b as shown in FIG. 15.

The rotating arm 271a on the forward run side is attached, by a bolt 271a' which functions as an axial center, at one end to the mounting base plate a4 of the gearbox 207a, so that the other end of the rotating arm 271a is supported to be vertically rotatable. Also the support shaft 205a of the pinch roller 205 is inserted and fixedly installed in the intermediate part of the rotating arm 271a. The support shaft 205a and the pinch roller 205 protrude horizontally from the intermediate part of the rotting arm 271a, supporting the rotating arm 271a so that the pinch roller 205 will come immediately above the driving roller 204 as shown in FIG. 16 and FIG. 17.

On the other hand, the rotating arm 271b on the return side, similarly to the rotating arm 271a on the forward side, is pivotally mounted below the driving roller 204 in the mounting base plate a4 by a bolt 271b' which serves as an axial center, being rotatably supported like the rotating arm 271a. Then, the support shaft 206a of the pinch roller 206 is fixedly mounted in the intermediate part of the rotating arm 271b, such that the support shaft 206a and the pinch roller 206 will project horizontally out from the rotating arm 271b and that the pinch roller 206 will be positioned immediately below the driving roller 204.

Figure 16:
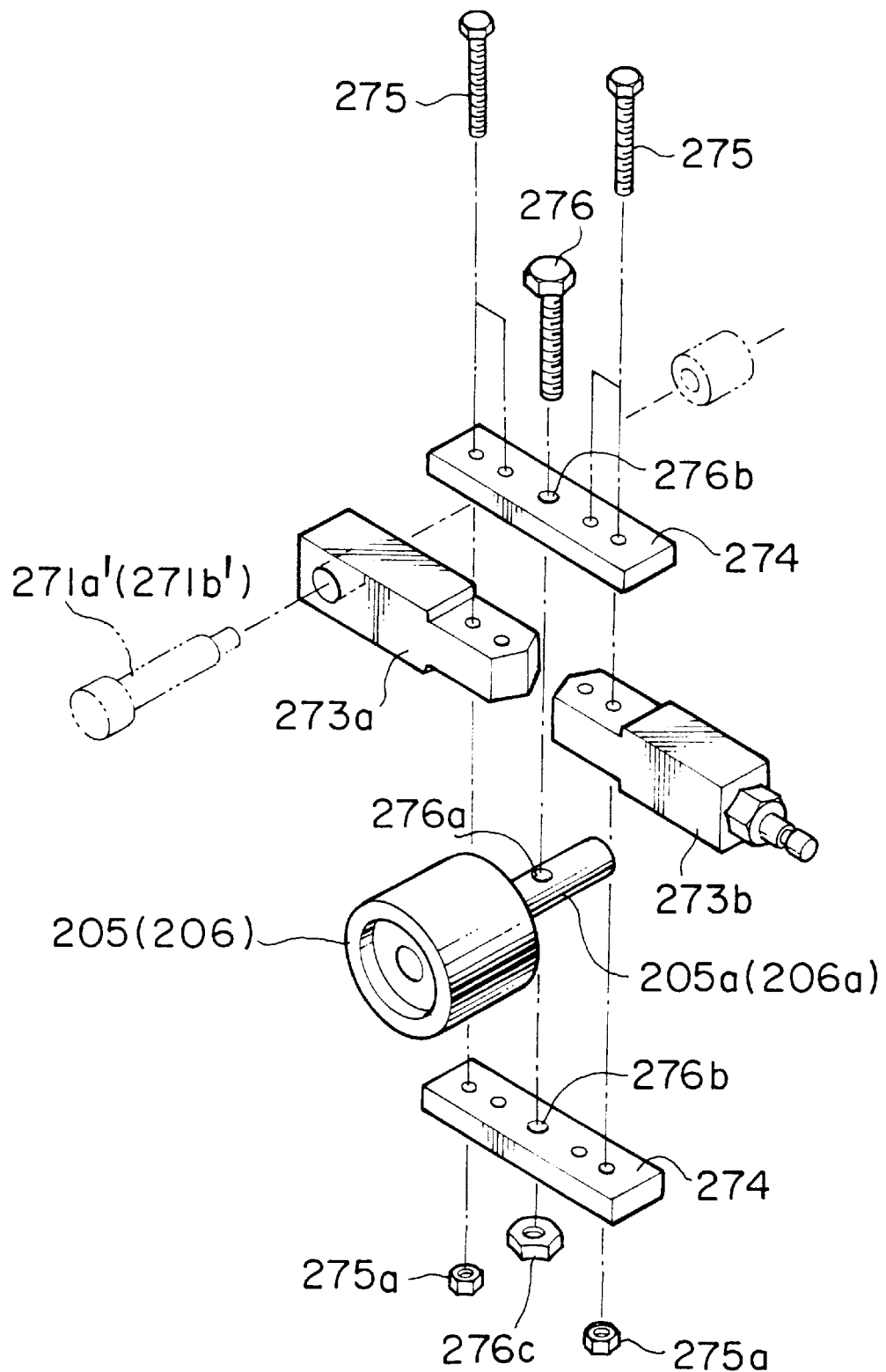
FIG. 16 is an exploded perspective view showing the pinch roller and a turning arm.
Figure 17:
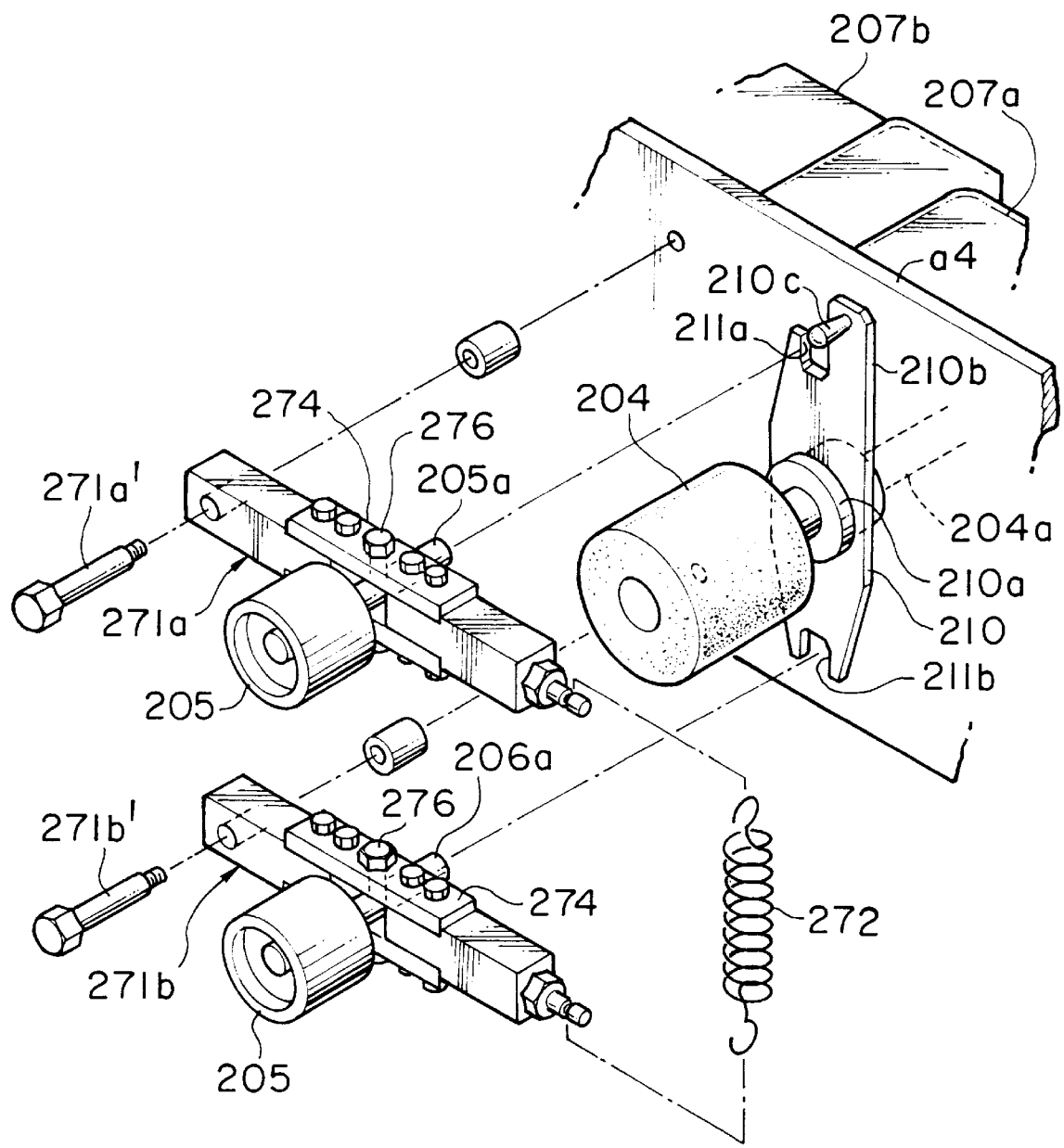
FIG. 17 is an exploded perspective view showing the driving roller and the pinch roller.

As shown in FIG. 16, the rotating arms 271a and 271b are comprised of two arms members 273a and 273b. The arm members 273a and 273b are held between two connecting plates 274, upper and lower; the arm members are connected into a form of a single arm by inserting two bolts 275 in this section and tightening a nut 275a. The end faces on the connected side of the arm members 273a and 273b are formed in an approximately V shape, and are set end to end with a space provided therebetween for insertion of the support shafts 205a and 206a of the pinch rollers 205 and 206. That is, this section is provided for insertion of the support shafts 205a and 206b.

Insertion holes 276b are provided in the central part of the connecting plates 274. In the insertion holes 276b is inserted a bolt 276 which is an axial center of the pinch rollers 205 and 206. A nut 276c is installed on the bolt 276 and tightened.

The support shafts 205a and 206a of the pinch rollers 205 and 206 have shaft holes 276a in the intermediate part of the projecting portion. The support shafts 205a and 206a are inserted into the inserting section in the intermediate part of the rotating arms 271a and 271b, and the bolt 276 which serves as an axial center is inserted into the shaft hole 276a, intersecting at right angles with the support shafts 205a and 206a.

Therefore, the support shafts 205a and 206a of the pinch rollers 205 and 206 are swingably supported by the bolt 276 as an axial center. Therefore, the support shafts 205a and 206a swing within the range of contact with both end faces of the arm members 273a and 273b at the connecting section, being followed by the swinging of the pinch rollers 205 and 206 which are supported on the support shafts 205a and 206a.

That is, the pinch rollers 205 and 206 are supported to swing through a predetermined angle to either side of the neutral point on the axial center 204' (i.e., the reference line L) of the driving roller 204 in a plan view. In the case of the present embodiment, the pinch rollers swing by 7.5° to either side from the axial center 204' as a neutral.

The arm members 273a and 273b are formed approximately V at the end faces of the connecting section; the end faces serve as stopper surfaces of the support shafts 205a and 206a, thereby maintaining the pinch rollers 205 and 206 at a predetermined angle.

Between the forward ends of the rotating arms 271a and 271b supported as described above, a coil spring 272 is installed as in the case of the curved belt conveyor A1. The forward ends of the rotating arms 271a and 271b are pulled close to each other by the force of the coil spring 272, to thereby constantly press the pinch rollers 205 and 206 supported in the intermediate part of the rotating arms 271a and 271b against the outer peripheral surface of the driving roller 204 as shown in FIG. 15.

On the support shaft 204a of the driving roller 204 a changeover lever 210 is swingably mounted. The changeover lever 210 is operated to switch the direction of swinging (direction of inclination with respect to the reference line L) of the pinch rollers 205 and 206 from normal to reverse direction and vice versa. The changeover lever 210 is a vertically long plate-like member. The support shaft 204a of the driving roller 204 is inserted through the cylindrical support section 210a provided in the intermediate section, thus being supported to swing on the same axial center as the support shaft 204a.

The changeover lever 210 is provided with engaging slots 211a and 211b cut in an approximately U shape in the upper and lower parts. The upper engaging slot 211a is engaged with the rear end of the support shaft 205a of the pinch roller 205 on the forward run side, while the lower engaging slot 211b is engaged with the rear end of the support shaft 206a of the pinch roller 206 on the return run side.

The projecting ends of the support shafts 205a and 205b of the pinch rollers 205 and 206 are held in the engaging slots 211a and 211b of the changeover lever. In this state, the changeover lever 210 is swung in the normal or reverse direction, and accordingly the support shaft 205a and 206a are swung mutually in opposite directions by the engaging slots 211a and 211b of the lever 210 which rotates in circle. As a result, the pinch rollers 205 and 206 are inclined in opposite directions from the reference line L.

The changeover lever 210 has an extended portion 210b formed by extending upwardly of the engaging slot 211a and is provided with a knob 210c in the extended portion 210b, by which the swinging direction of the lever is changed over.

Figure 18A:
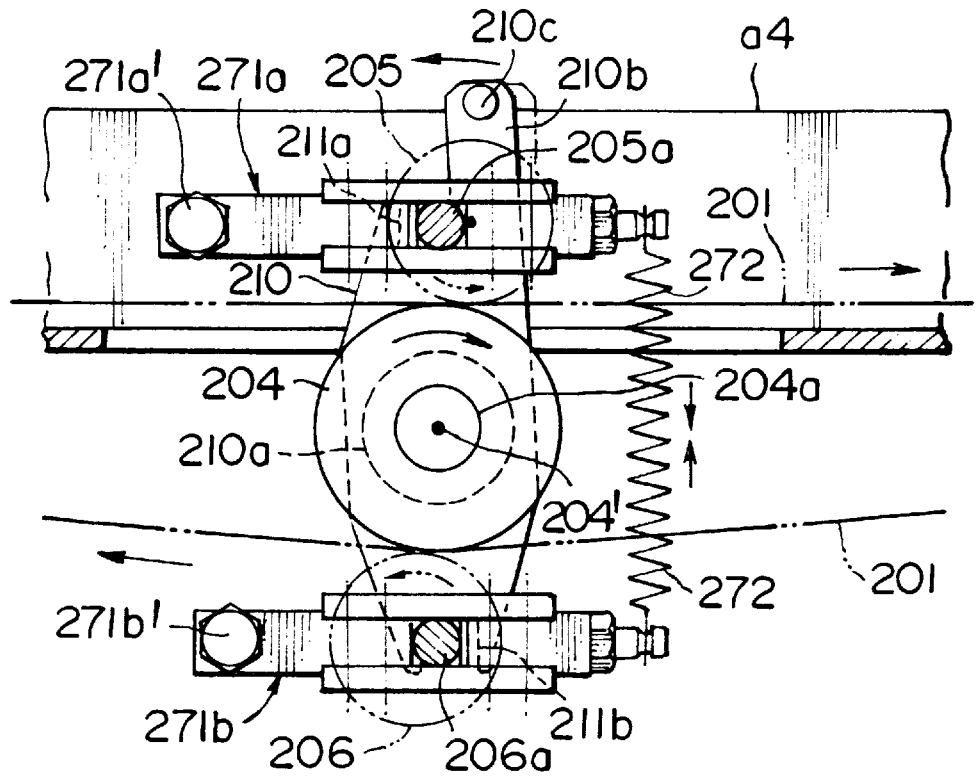
Figure 18B:
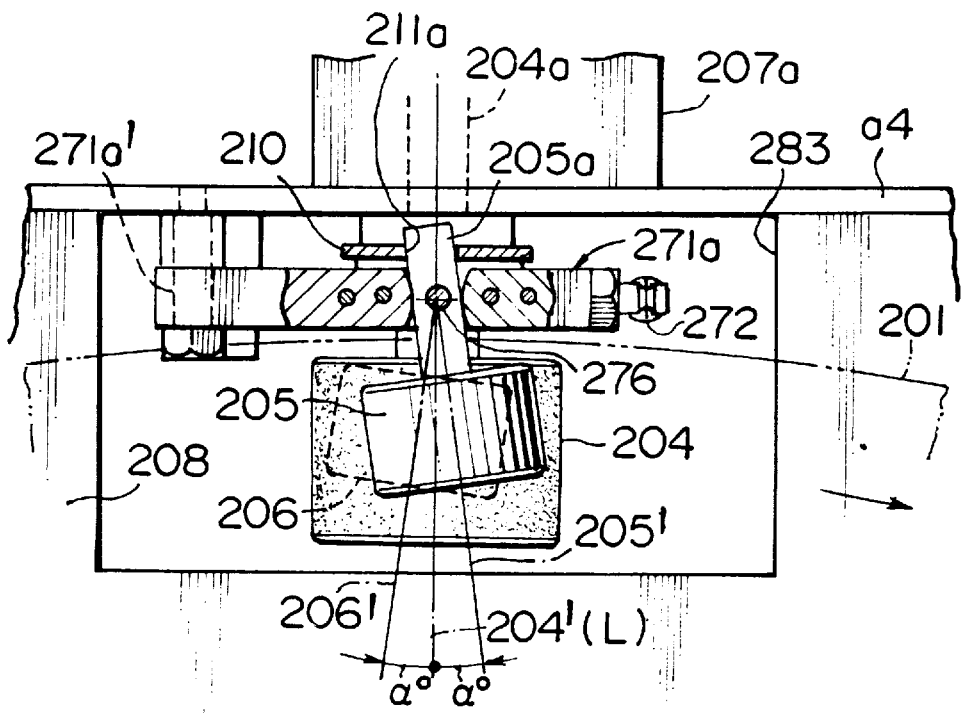

Concretely, when the curved belt 201 is turned in the normal direction, the knob 210c provided in the upper part of the changeover 210 moves to the left as shown in FIGS. 18A and 18B. At this time, the upper engaging slot 211a of the changeover lever 210 moves to the left, whereby the pinch roller 205 on the forward run side and the support shaft 205a are held in a position in which the forward end of support shaft 205a beyond the bolt 276 as an axial center is inclined to the right. At the same time, the lower engaging slot 211b of the changeover lever 210 moves to the right, and accordingly the pinch roller 206 on the return run side and the support shaft 206a are held in a position in which the forward end side of the pinch roller 206 beyond the bolt 276 as an axial center is inclined to the left.

Figure 19A:
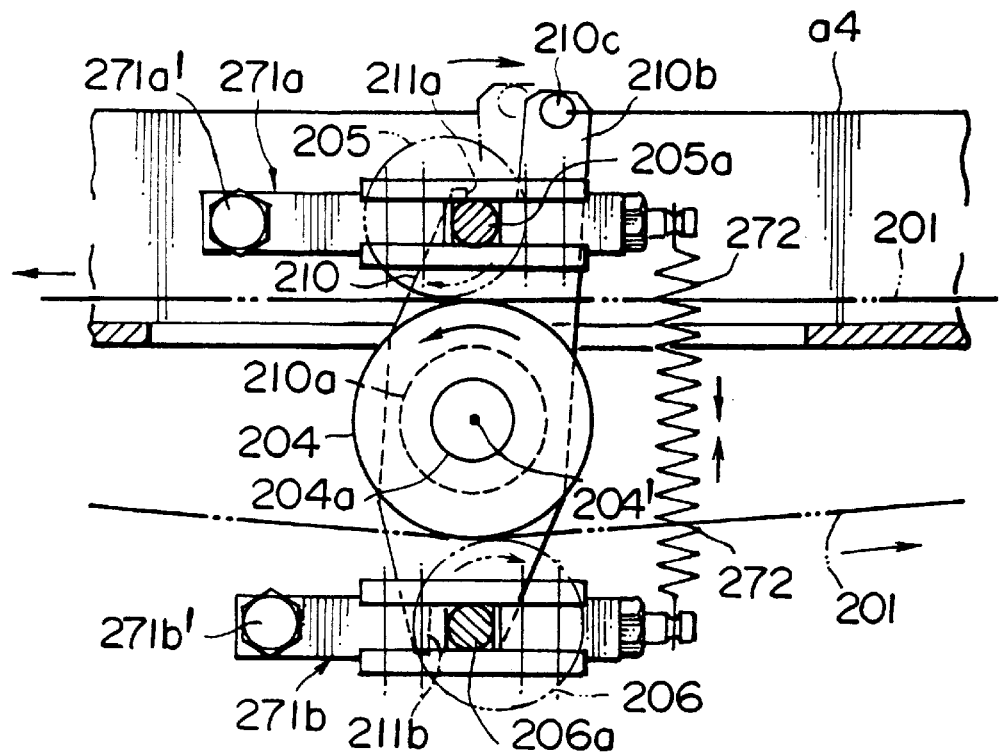
Figure 19B:
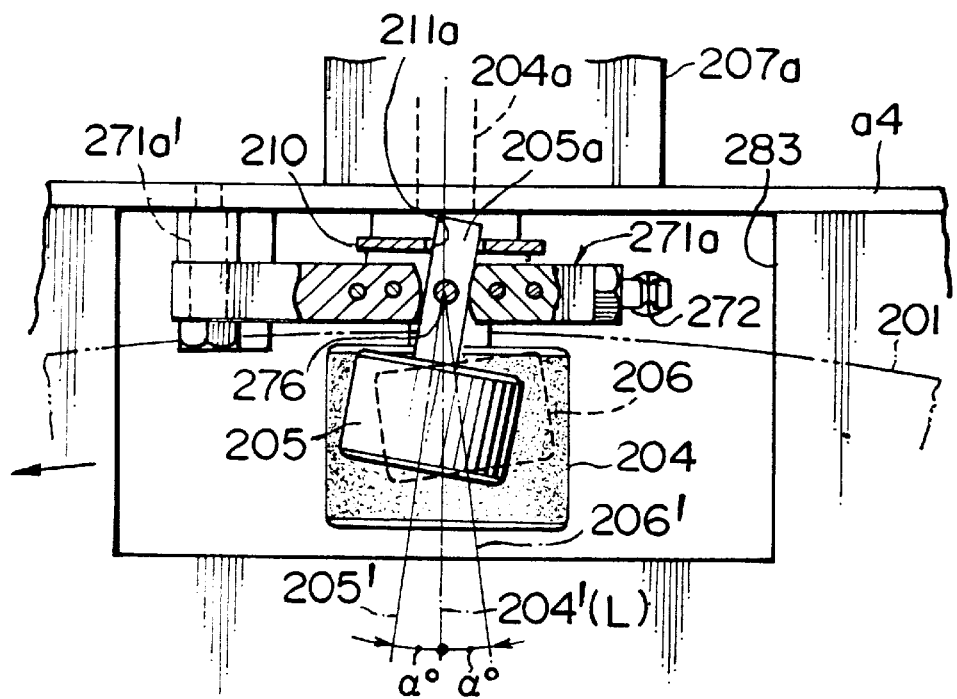

Reversely, when the curved belt 201 is to be reversed, the knob 210c on the upper part of the changeover lever 210 is moved to the right as shown in FIGS. 19A and B. At this time, the upper engaging slot 211a of the changeover lever 210 moves to the right; and the pinch roller 205 on the forward run side and the support shaft 205a are held in a position in which the forward end of the pinch roller 205 beyond the bolt 276 which serves as an axial center is inclined to the left. At the same time, the lower engaging slot 211b of the changeover lever 210 moves to the left; therefore the pinch roller 206 on the return side and the support shaft 206a are held in a position in which the forward end of the pinch roller 206 beyond the bolt 276 is inclined to the right as shown in FIG. 19B.

The changeover lever 210 is connected with the driving motor 207b for driving the driving roller 204; as shown in FIG. 18A and FIG. 18B, when the changeover lever is turned to the normal direction, the driving roller 204 rotates in the normal direction. Reversely, when the changeover lever 210 is reversed as shown in FIGS. 19A and B, the driving roller 204 rotates reversely.

In the present embodiment, the changeover lever 210 is designed to be manually operated. The operation of the changeover lever may be automatically performed by using a pneumatic-hydraulic cylinder, solenoid, etc. In this case also the direction of rotation of the driving roller is changed in interlock with the changeover lever operation.

Consequently, as shown in FIG. 18A and FIG. 18B, when the changeover lever 210 is swung to the normal direction to drive the driving roller 204 in the normal direction (i.e., when he curved belt conveyor A2 is turned in the normal direction), the forward run side of the curved belt 201 which is in contact with the outer periphery of the driving roller 204 turns from one end side to the other end side of the curved belt 201. At the same time, the return run side of the curved belt 201 turns from the other end side towards one end side of the conveyor. Furthermore, the pinch rollers 205 and 206 in contact with the forward run side and the return run side of the curved belt 201 rotate with the rotation of the curved belt 201.

The pinch rollers 205 and 206 on the forward run side and the return run side are rotatably supported with their axes 205' and 206' inclined to the normal direction with respect to the reference line L in a plan view, whereby the outer peripheral section of the curved belt 201 driven by the contact force of the pinch rollers 205 and 206 is pressed towards the outside of turning.

In the above-described state of normal driving, the projecting end of the support shaft 205a is swung and held in the swing position in the direction of normal driving by a holding force of the upper engaging slot 211a of the changeover lever 210, and therefore the forward end side of the support shaft 205a beyond the bolt 276 which serves as an axial center swings towards the other end side of the curved belt 201. Therefore the axial center 205' is held as inclined by α° with respect to the reference line L.

The inclination angle of the axial center 205' of the pinch roller 205 is set to an appropriate angle at which the curved belt 201 can be efficiently driven towards the outside of turning. In the present embodiment, the inclination angle α° is set at 7.5° as shown in FIG. 18B.

In the meantime, since the projecting end of the support shaft 206a is held in the swing position in the direction of normal driving by a holding force of the upper engaging slot 211b of the changeover lever 210, the pinch roller 206 on the return run side swings in a reverse direction of the pinch roller 205 on the forward run side, or toward one end of the curved belt 201, with the axial center 206' inclined by α° with respect to the reference line L. Also the inclination angle of the axial center 206' of the pinch roller 206 is set at the same angle of 7.5° as that of the pinch roller 205 on the forward run side as shown in FIG. 18B.

Next, the dynamic balance acting on each part during normal operation of the curved belt 201 will be explained.

In the curved belt conveyor A2 constituted as described above, when the driving roller 204 is driven to make a normal turn, the forward run side of the curved belt 201 which is in contact with the outer periphery of the upper part of the driving roller 204 moves from one end side towards the other end side of the conveyor, and at the same time the return run side of the curved belt 201 which is in contact with the outer periphery of the lower part of the driving roller 204 moves from the other end side to one end side of the conveyor. Consequently, the curved belt 201 mounted between the rollers 202a and 202b turns in the normal direction as shown in FIG. 18A and FIG. 18B.

The curved belt conveyor A2, when turned in the normal direction as described above, requires the dynamic balance for the normal driving of the curved belt conveyor A1 shown in FIGS. 1 and 2, that is, entirely the same balance as the dynamic balance explained by referring to FIGS. 8 and 9. Therefore, the dynamic balance for the normal operation of the curved belt conveyor A2 of the present embodiment will not be explained.

In the meantime, when the curved belt conveyor A2 is to be reversed, the changeover lever 210 is moved to the reverse direction, that is, the upper portion of the lever 210 is swung to the other end side of the curved belt 201, and at the same time the driving roller 204 is driven in the reverse direction.

During reverse operation, the forward run side of the curved belt 201 in contact with the outer periphery of the driving roller 204 turns from the other end side towards one end side of the conveyor, and at the same time the return run side of the curved belt 201 turns from one end side towards the other end side of the conveyor. Furthermore, the pinch rollers 205 and 206 which are in contact with the forward and return run sides of the curved belt 201 rotate with the turning of the curved belt 201. At this time the direction of rotation of the pinch rollers 205 and 206 is reverse to the normal direction.

In the above-described reverse operation, since the projecting end of the support shaft 205a is held in the swinging position in the reverse direction by the holding force of the upper engaging slot 211a of the changeover lever 210, the forward end of the support shaft 205a beyond the bolt 276 as an axial center swings towards one end of the curved belt 201. In this position the pinch roller 206 is held on the axial center 205' inclined by 7.5° with respect to the reference line L as shown in FIG. 19B.

In the meantime, since the projecting end of the support shaft 206a is held in the swinging position in the reverse direction by the holding force of the lower engaging slot 211b of the changeover lever 210, the pinch roller 206 on the return run side swings in the reverse direction of the pinch roller 205 on the forward run side, that is, towards the other end side of the curved belt 201, with the axial center 205' inclined at 7.5° with respect to the reference line L as shown in FIG. 19B.

Figure 20A:
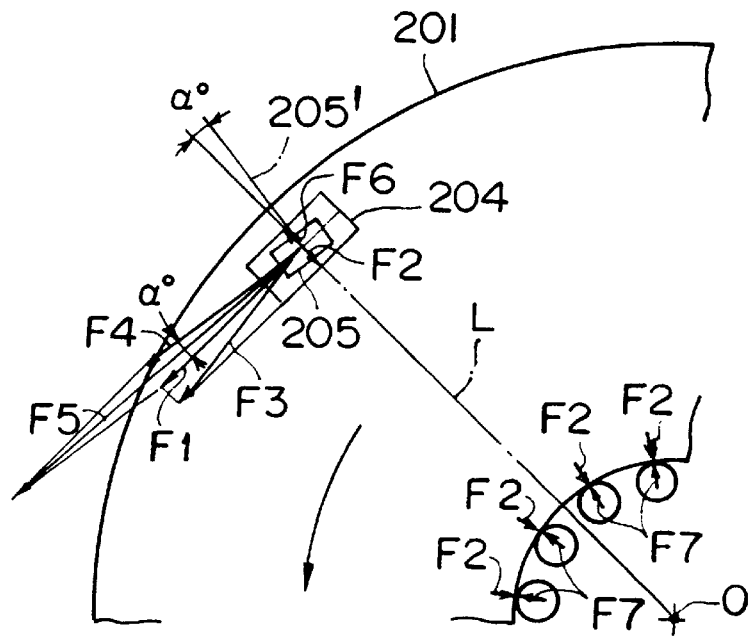
Figure 20B:
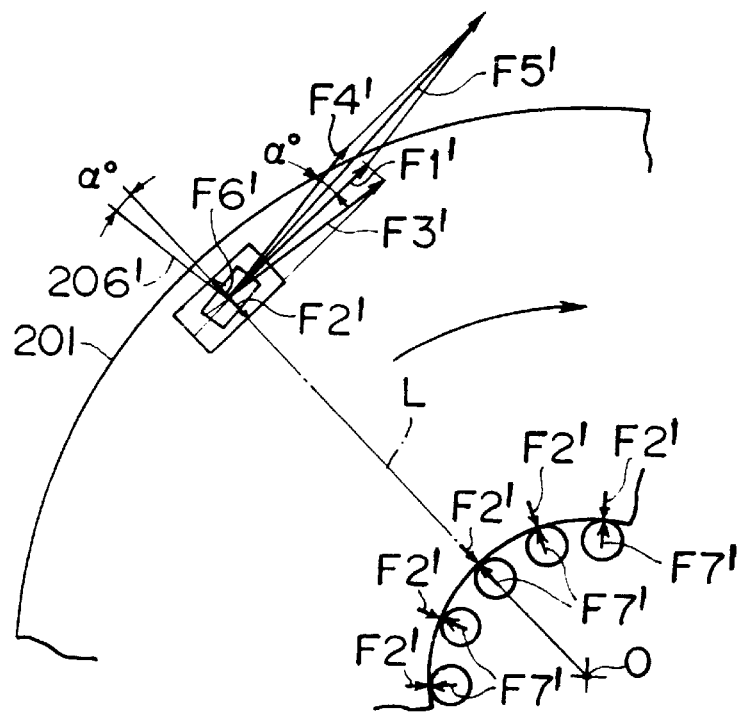

FIG. 20A and FIG. 20B show dynamic balance acting on each part of the conveyor during reverse operation. The dynamic balance during reverse operation, however, acts with a complete symmetry in relation to the dynamic balance (with reference to the reference line L) during normal operation explained by referring to FIGS. 8 and 9. Therefore, a power relation of the curved belt 201, the driving roller 204, and the pinch rollers 205 and 206, acting in a reverse direction of the normal operation, are shown only in vectors in FIG. 20A and FIG. 20B and will not be explained.

The greater the inclination angle $\alpha°$ of the pinch rollers 205 and 206, the greater the pulling force F6, F6' for pulling the outer peripheral section of the curved belt 201 can be increased. To maintain a stabilized running state, it is sufficient only to keep the relationship of $F2 \leq F6+F7$ and $F2' \leq F6'+F7'$. No satisfactory effect can be expected if the pulling force is increased more than needed.

The present applicant has repeatedly conducted a number of tests, obtaining the especially good result that the inclination angle $\alpha°$ of the pinch rollers 205 and 206 is within the range of 5° to 10°. It should be noted that the inclination angle $\alpha°$ of the pinch rollers 205 and 206 is not limited to the above-described value and may be set to any value if the above-described effect can be expected.

The set value of the inclination angle $\alpha°$ of the pinch rollers is similarly applicable to the curved belt conveyor A1 shown in FIG. 1 and FIG. 2.

In the present embodiment, the driving roller 204 and the driving unit for driving the pinch rollers 205 and 206 are disposed at center of the outer peripheral section of the curved belt 201; the driving unit may be set close to one end or to the other end of the curved belt 201 if only the axial center 204' of the driving roller 204 is present on the axis radially developing from the turning center O.

Furthermore, it is to be noticed that there is provided one driving unit including the driving roller 204 and the pinch rollers 205 and 206 in the curved belt 201, and the number of the driving unit may be increased to two or more. In this case, it is possible to properly drive the curved belt 201 although the manufacturing cost will increase, and accordingly to improve the effect of preventing the curved belt 201 from moving towards the inside of turning.

The location and quantity of the driving unit to be set are similarly applicable also to those in the curved belt conveyor A1.

Furthermore, the curved belt conveyor of the present embodiment the 90° angle is provided between the rollers 202a and 202b at both ends of the conveyor. However, it should be noticed that, in the curved belt conveyor of the present invention, the angle is not limited to 90° and can be set to 90° and less or 90° and more (not illustrated).

Next, a preferred embodiment of the curved belt conveyor according to claims 5 and 6 will be explained. The curved belt conveyor A3 shown in FIG. 21 to FIG. 29 is similar to the curved belt conveyors A1 and A2 described above. In the curved belt conveyor A3, a plurality of belt pinching units b1 to b3 including the driving roller 4 in the curved belt conveyor A1 and A2, intermediate rollers 304 corresponding to the driving roller 204, and pinch rollers 305 and 306, are mounted along the outer peripheral section of the curved belt 301.

In the curved belt conveyor A3, similarly to the curved belt conveyors A1 and A2, rollers 302a on the start end side of the conveyor including a number of small rollers 320 which are coaxially juxtaposed, and rollers 302b on the discharge end side of the conveyor, are arranged at the angle of 90° in a plan view, on the conveyor body 300a which is the frame of the conveyor construction. Also between these rollers 302a and 302b an endless curved belt 301 is mounted to form an approximately circular carrying track in a plan view. Furthermore, the rollers 302a and 302b may be knife edges.

The curved belt conveyor A3 is a relatively wide, large type with a curved belt 301 of about 1-meter effective width.

The outer peripheral section of the curved belt 301 is equipped with three belt pinching units b1 to b3, which have intermediate rollers 304 and two pinch rollers 305 and 306 and are arranged circumferentially at a spacing. The intermediate rollers 304 correspond to the driving rollers 4 and 204 in the curved belt conveyors A1 and A2.

The curved belt conveyor A3 is of such a construction that the curved belt 301 is driven with its outer peripheral edge section interposed between the intermediate rollers 304 and the pinch rollers 305 and 306, the curved belt 301 is driven to turn in the carrying direction. The curved belt conveyor A3, like the curved belts A1 and A2, requires no guide rollers for supporting the curved belt from inside.

The curved belt 301 mounted between the rollers 302a and 302b is a doughnut-shaped sheet of approximately conical form like an umbrella, and is mounted in a two-fold state, between the rollers 302a and 302b, by inserting first the large-diameter outer peripheral section to thereby form a flat, approximately sectoral, circular carrying track in a plan view as shown in FIG. 21.

Figure 22:
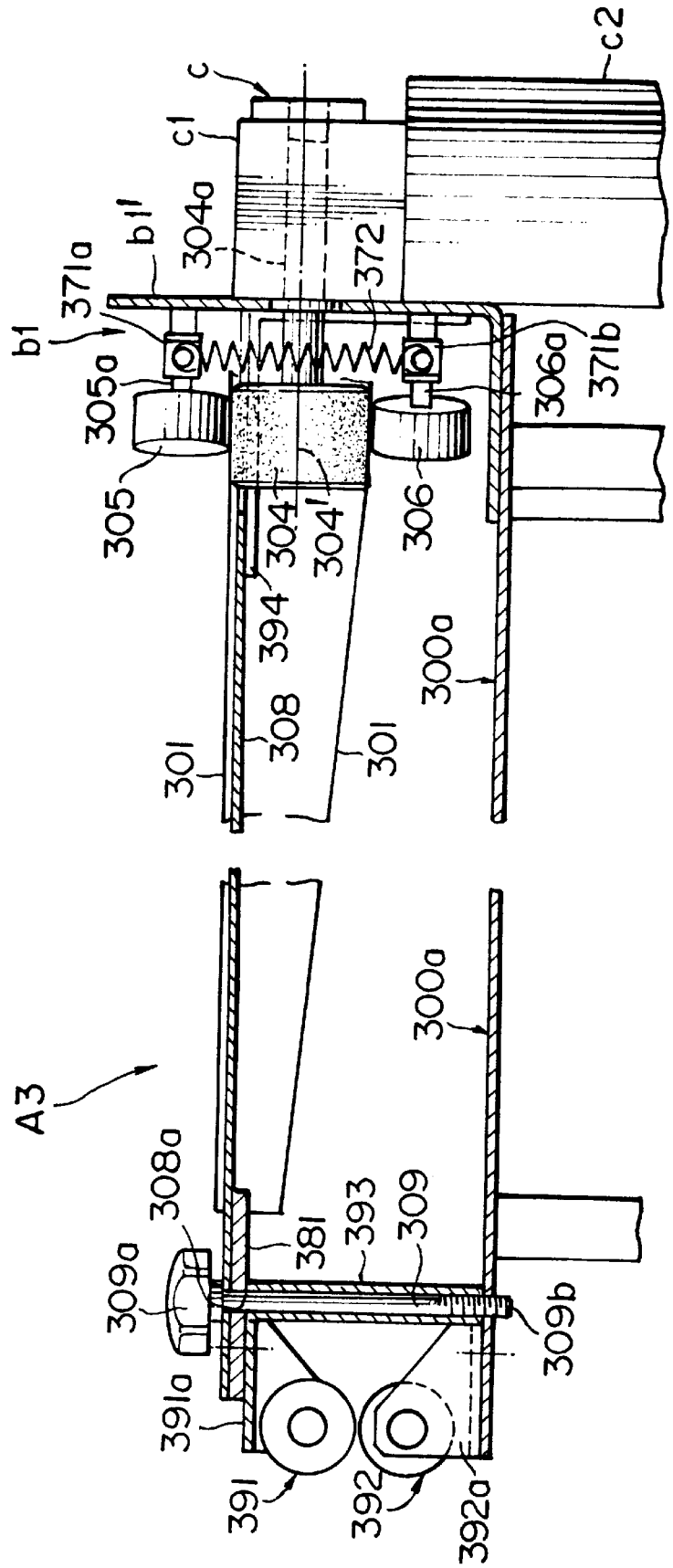
FIG. 22 is a sectional view taken along line XXII—XXII in FIG. 21.

The forward run side of the curved belt 301 thus mounted between the rollers 302a and 302b is supported from below by a base 308 which is set level and approximately horizontally as shown in FIG. 22. The base 308 is formed in an approximately sectoral, circular shape similarly to the flat type used in the curved belt 301. The base 308 is set such that the outer peripheral edge section is a little inside of the outer periphery of the curved belt 301.

To support the turning center side of the base 308, a combination of an upper support roller 391 mounted under the turning center side of the curved belt 301 and a lower support roller 392 fixedly mounted on the conveyor body 300a, and a tubular holding member 393 are employed. Also the base 308 is horizontally set along the surface immediately under the forward run side of the curved belt 301 by fixedly attaching the outer peripheral section of the base 308 to the conveyor body 300a by means of a support plate 394 formed at both ends of the outer peripheral section.

That is, the base 308 supports the curved belt 301 levelly and horizontally from under almost the entire surface of the forward run side; both end edges extending close to the rollers 302a and 302b.

On the underside of the inner peripheral side of turning the base 308, a stiffening plate 381 is fixedly attached and a bolt insertion hole 308a is provided through the stiffening plate 381 and the base 308.

In the bolt insertion hole 308a a mounting bolt 309 with a handle 309a is inserted. Furthermore, the mounting bolt 309 is inserted into a tubular holding member 393 interposed between the base 308 and the conveyor body 300a, then being threadedly tightened into a screw hole 309b provided in the conveyor body 300a. The holding member 393 is interposed as a spacer between the base 308 and the conveyor body 300a by tightening the mounting bolt 309, thus holding the inner peripheral side of the base 308 at a specific level and also being reliably secured on the conveyor body 300a as shown in FIG. 22.

On the stiffening plate 381 provided on the underside of the inner peripheral side of the base 308, the upper support roller 391 is rotatably supported through a roller support member 391a. The upper support roller 391 is mounted and supported so as to rotate along the reference line L1 (FIG. 21 and FIG. 22) which extends towards the central part of the outer periphery of the belt from the turning center O of the curved belt 301 in a plan view.

Figure 25:
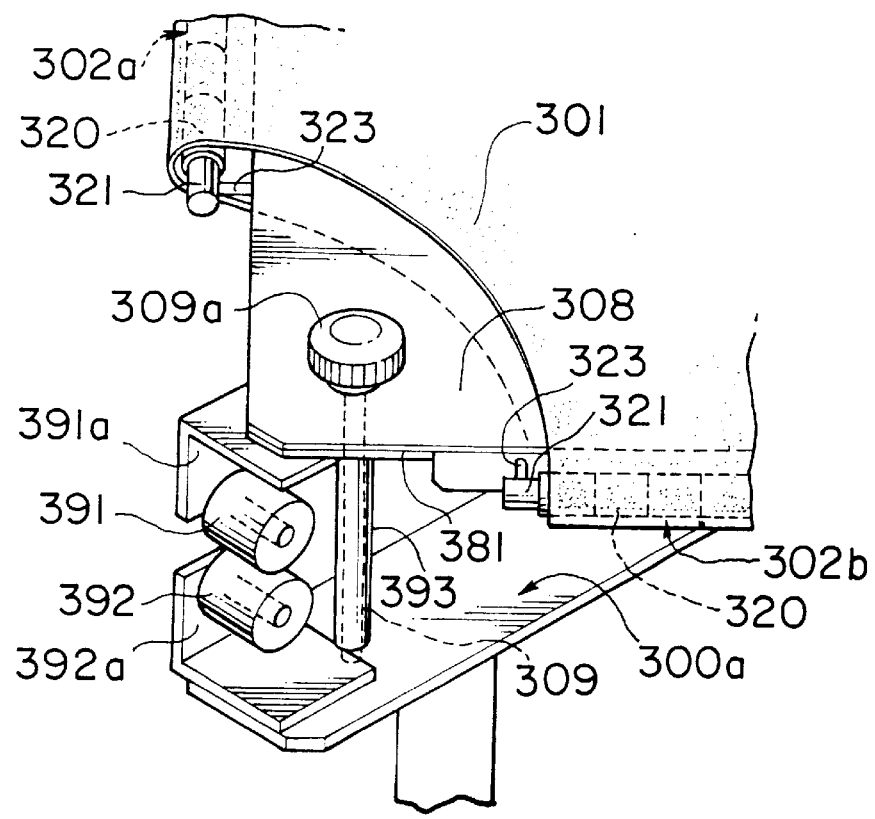
FIG. 25 is a perspective view showing an inner peripheral side part of the curved belt.

Also, on the conveyor body 300a located immediately below the upper support roller 391, the lower support roller 392 is rotatably mounted and supported through a roller support member 392a; and the outer peripheral surfaces of the lower support roller 392 and the upper support roller 391 are set in mutual contact with each other as shown in FIG. 22 and FIG. 25. The state "the outer peripheral surfaces of the lower support roller 392 and the upper support roller 391 are set in mutual contact with each other" is the state that the outer peripheral surfaces are set close to each other with a slight clearance provided therebetween, or the outer peripheral surfaces of the rollers 391 and 392 are in light contact with each other.

The base 308, as described above, is supported both by the holding member 393 and by a combination of the upper and lower support rollers 391 and 392. It is, therefore, possible to prevent the inner peripheral side of the base 308 from bending to deform with its own weight even when the mounting bolt 309 is removed because the outer peripheral surfaces of the upper and lower support rollers 391 and 392 mutually contact each other and are supported from below by the rollers 391 and 392.

Figure 28:
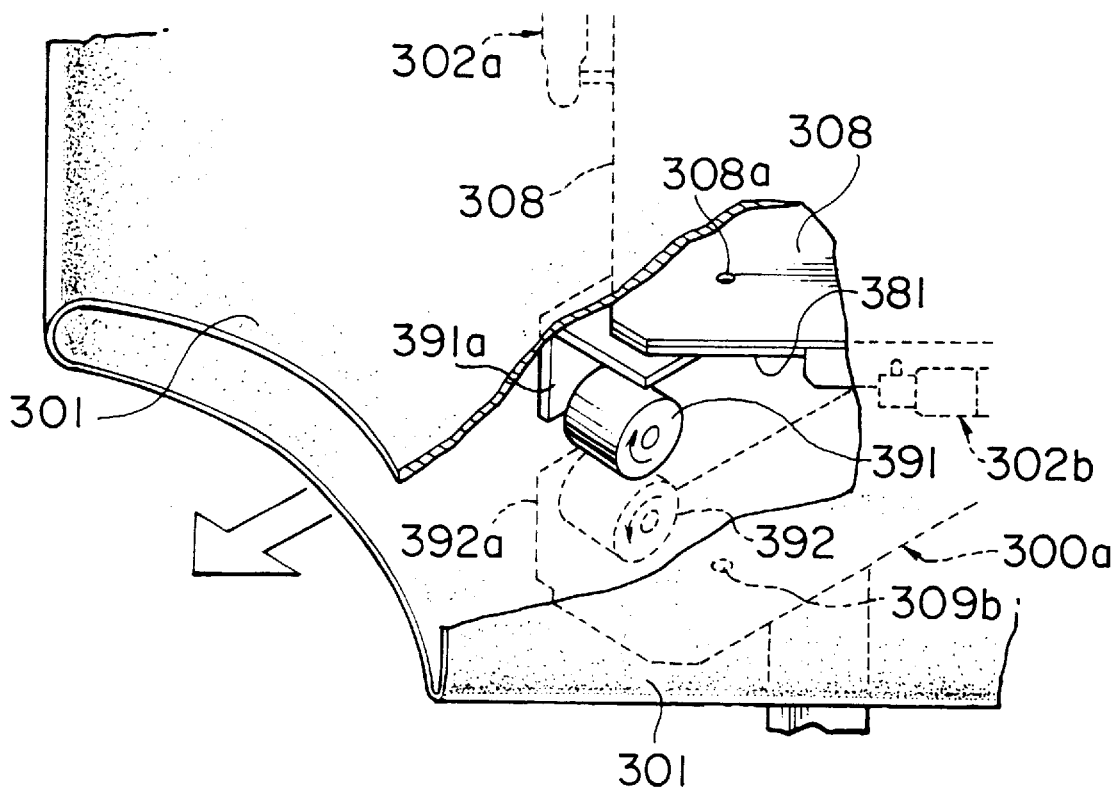
FIG. 28 is a perspective view showing the inner peripheral section of a base plate with the curved belt being drawn out.
Figure 29:
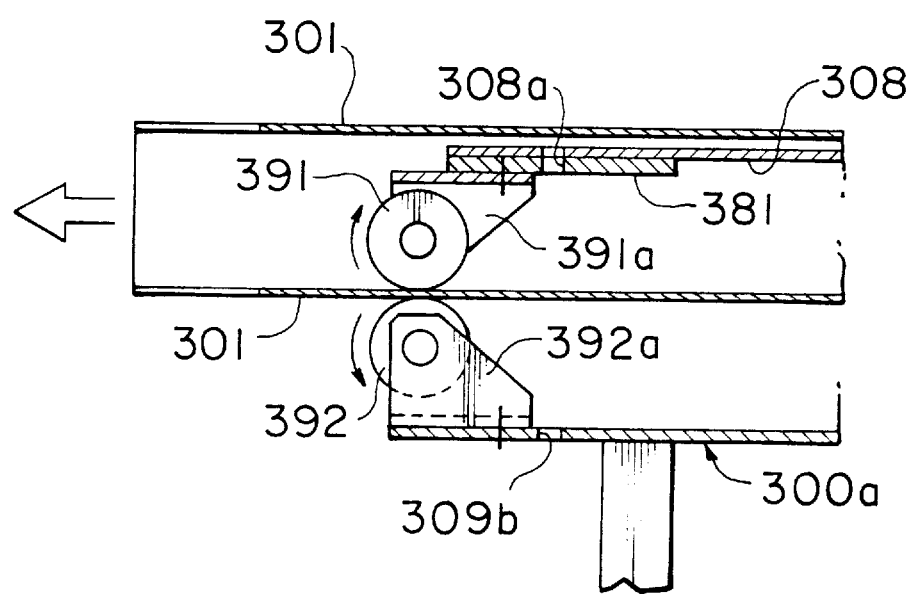
FIG. 29 is a longitudinal sectional view of the same section.

After the removal of the mounting bolt 309, as shown in FIG. 28 and FIG. 29, the curved belt 301 mounted between the rollers 302a and 302b can be removed through between the upper and lower support rollers 391 and 392. That is, the curved belt 301 can be easily removed simply by removing one mounting bolt 309.

In case the upper and lower support rollers 391 and 392 are not present, the inner peripheral side of the base 308 droops to deform with its own weight, making it difficult to remove and install the curved belt 301.

In the meantime, on the outer peripheral side of the curved belt 301 on the conveyor body 300a, three belt pinching units b1 to b3 are circumferentially arranged at a predetermined spacing.

The belt pinching units b1 to b3 turns the curved belt 301 and also function to pull the outer peripheral edge of the curved belt 301 towards the outside of turning, thereby providing the curved belt 301 with an appropriate tension during operation and accordingly preventing moving towards the inner peripheral side of turning. The belt pinching units b1 to b3 are comprised of the intermediate roller 304 corresponding to the driving roller 4, 204 of the curved belt conveyor A1, A2 and two pinch rollers 305 and 306.

In the curved belt conveyor A3, of the three belt pinching units b1 to b3, only the belt pinching unit b1 located at the central part is mounted with a driving mechanism c; and the belt pinching units b2 and b3 mounted on both sides of the unit b1 is constituted such that the intermediate rollers 304 and the pinch rollers 305 and 306 rotate with the turning of the curved belt 301.

The belt pinching unit b1 disposed in a position corresponding to the center of the outer peripheral section of the curved belt 301 on the conveyor body 300a is constituted by supporting the intermediate roller 304 and the pinch rollers 305 and 306 on the unit base plate b1' which is fixedly mounted on the conveyor body 300a as shown in FIG. 22.

Figure 26A:
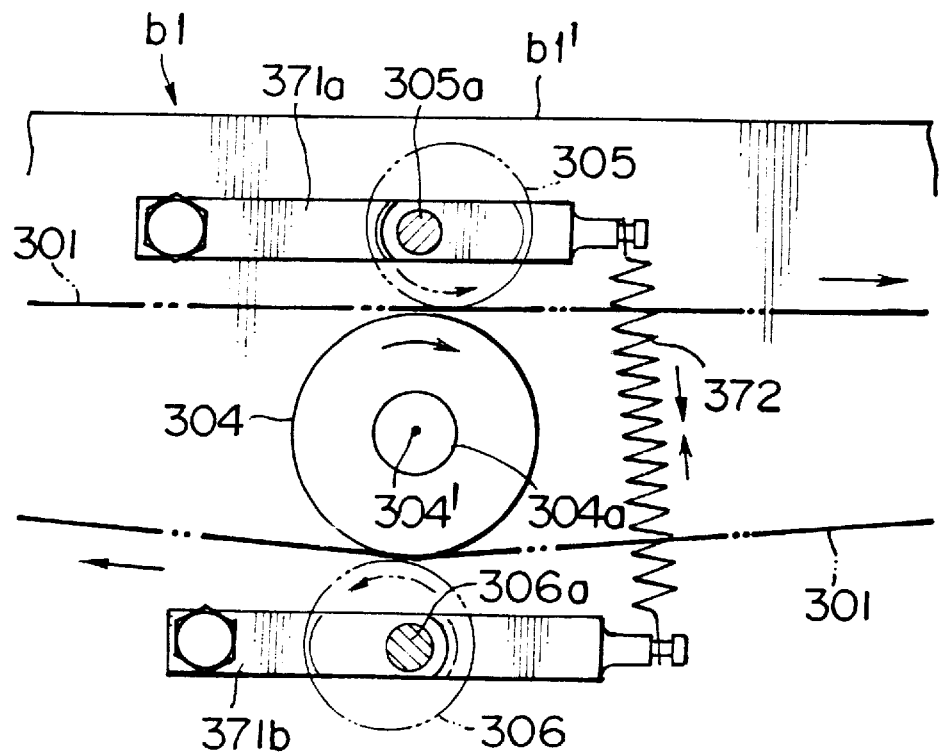
Figure 26B:
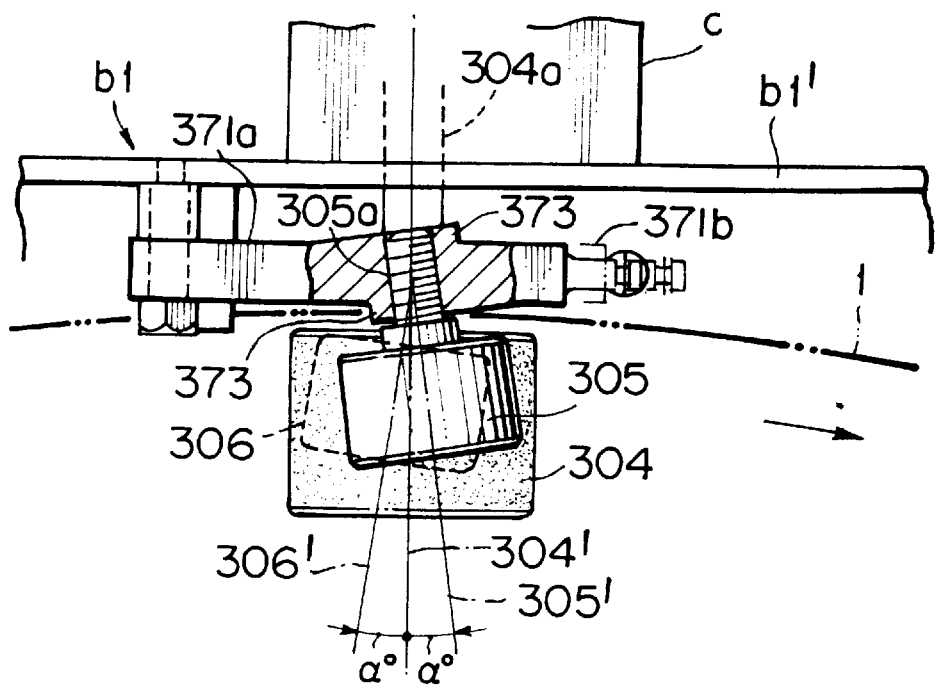

The intermediate roller 304 of the central belt pinching unit b1 rotates in contact with the outer peripheral section of the curved belt 301 as previously stated, to thereby turn the curved belt. In a plan view, with the axial center 304' aligned with the reference line L1 which extends from the turning center O of the curved belt 301 towards the center of the outer periphery of the curved belt 301, the intermediate roller 304 is rotatably supported as shown in FIG. 21 and FIG. 26B. Also the intermediate roller 304 is set at the center of the outer periphery of the curved belt 301 where the reference line L1 passes through, and is supported in an inserted state with the axial center 304' set horizontally between the forward run side and the return run side of the curved belt 301 as shown in FIG. 22.

The intermediate roller 304 is a cylindrical body covered with an anti-slip or hard-to-slip material over the outer peripheral surface and fitted in one end of the support shaft 304a. The intermediate roller 304 is rotatably coupled with the gearbox c1 by inserting the support shaft 304a in the opening of the outer peripheral section of the curved belt 301, and further by inserting the support shaft 304a which projects horizontally outwards of the curved belt 301, through from the inner peripheral side of the unit base plate b1', into the gearbox c1 of the driving mechanism c mounted on the back side of the base plate b1'.

Furthermore, the uppermost portion of the outer peripheral surface of the intermediate roller 304 is held in contact with the inner surface on the forward run side of the outer peripheral section of the curved belt 301 extended to the outside of turning beyond the outer peripheral edge of the base 308, and with the inner surface on the forward run side of the outer peripheral section of the curved belt 301 as shown in FIG. 22.

The gearbox c1 of the driving mechanism c, as described above, is fixedly mounted on the outer surface of the unit base plate b1' fixedly mounted on the conveyor body 300a, and the support shaft 304a of the intermediate roller 304 is driven at a predetermined number of revolution by the driving motor c2 mounted under the gearbox c1.

Immediately above the forward run surface of the curved belt 301 corresponding to the location of the intermediate roller 304 and immediately below the return run surface, the pinch roller 305 and the pinch roller 306 are disposed. Between the pinch rollers 305 and the pinch roller 306 and the outer peripheral surface of the intermediate roller 304 the outer peripheral section of the forward run side and the outer peripheral section of the return run side of the curved belt 301 are interposed. The pinch rollers 305 and 306 are freely rotatably supported on an unillustrated support mounted on the outer periphery of the support shafts 305a and 306a.

The support shafts 305a and 306a of the pinch rollers 305 and 306 are inserted and fixed in a shaft inserting section 373 formed in the intermediate section of the rotating arms 371a and 371b respectively, so that the axial centers 305' and 306' will be supported, protruding approximately horizontally from the intermediate section of the rotating arms 371a and 371b.

Figure 23:
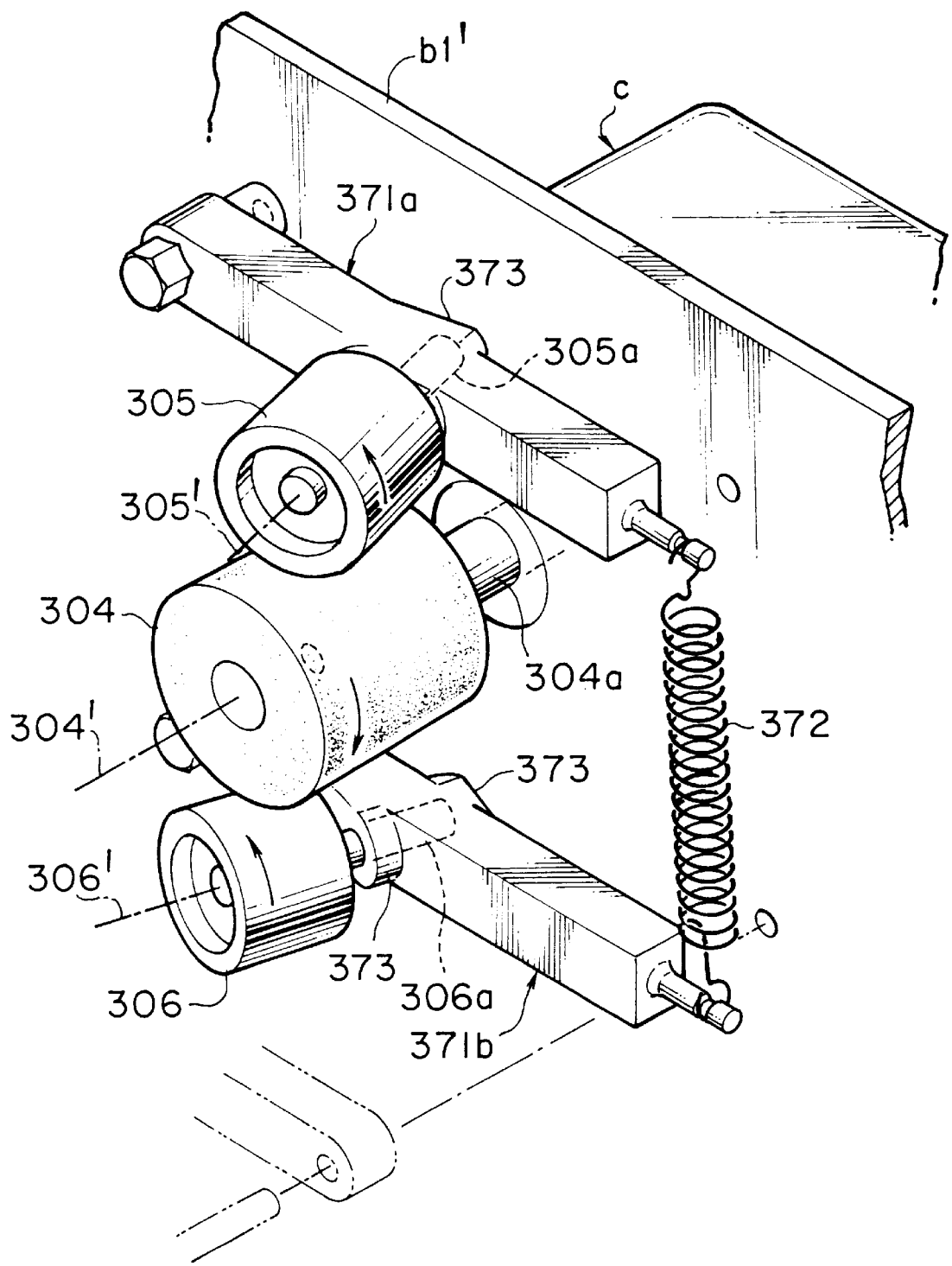
FIG. 23 is a perspective view showing a belt pinching unit section at center.

The rotting arm 371a on the forward run side is attached at one end portion to the unit base plate b1' of the gearbox c1, in such a manner that the other end of the arm 371a will swing up and down. Also, the support shaft 305a of the pinch roller 305 is inserted and horizontally mounted and fixed in the shaft inserting portion 373 of the rotating arm 371a, so that the support shaft 305a and the pinch roller 305 will protrude horizontally out of the rotating arm 371a. In this state, the pinch roller 305 is positioned immediately above the intermediate roller 304 as shown in FIG. 23 and FIG. 26A and B.

In the meantime, the rotating arm 371b on the return run side is attached at one end beneath the intermediate roller 304 in the unit base plate b1' section, being supported to rotate like the rotating arm 371a. The support shaft 306a of the pinch roller 306 is inserted and secured in the shaft inserting section 373 of the rotating arm 371b, so that the support shaft 306a and the pinch roller 306 will protrude out of the rotating arm 371b. In this state the pinch roller 306 is positioned immediately below the intermediate roller 304.

Between the forward ends of the rotating arms 371a and 271b supported as described above, a coil spring 372 is installed. The forward ends of the rotating arms 371a and 271b are mutually pulled to each other by the spring force of the coil spring 372, thereby constantly pressing the pinch rollers 305 and 306 supported in the intermediate section of the rotating arms 371a and 371b against the outer peripheral surface of the intermediate roller 304.

That is, the pinch rollers 305 and 306 mounted on both the outer peripheral section on the forward run side and the outer peripheral surface on the return run side of the curved belt 301, being pulled by the coil spring 372 as described above, are pressed against the outer peripheral surface of the intermediate rollers 304.

Therefore, when the intermediate roller 304 is rotated in the normal direction, the forward run side of the curved belt 301 which is in contact with the outer periphery of the intermediate roller 304 turns from the start end side toward the discharge end side, and at the same time the return run side of the curved belt 301 turns from the discharge end side towards the start end side. At the same time, the pinch rollers 305 and 306 in contact with the forward and return run sides of the curved belt 301 rotate with the turning of the curved belt 301.

The pinch rollers 305 and 306 on both the forward and return sides are inserted in a slightly inclined position in the shaft inserting portion 373 of the rotating arms 371a and 371b, whereby the axial centers 305' and 306' are rotatably supported, inclined to a predetermined direction, with respect to the reference line L1 in a plan view. The outer peripheral section of the curved belt 301 which is turning as described above is pressed towards the outside of turning by the contact force of the pinch rollers 305 and 306 as shown in FIG. 23 and FIG. 26B.

As shown in B26B (a plan view), the pinch roller 305 supported by the rotating arm 371a on the forward run side is supported with the axial center 305' inclined by $\alpha°$ with respect to the reference line L1. The direction of inclination of the axial center 305' of the pinch roller 305 is the direction in which the forward end of the support shaft 305a directed towards the inside of turning advances towards the discharge end of the conveyor. In the case of the present embodiment, the inclination angle $\alpha°$ is set at 7.5°.

Also as shown in FIG. 26B (a plan view), the pinch roller 306 supported by the rotating arm 371b on the return run side is supported with the axial center 306' inclined by $\alpha°$ with respect to the reference line L1. The direction of inclination of the axial center 306' of the pinch roller 306 is the direction in which the forward end of the support shaft 306a directed towards the inside of turning advances towards the start end of the conveyor. The inclination angle $\alpha°$ is set at 7.5° similarly to the pinch roller 305 on the forward run side. That is, this means that the pinch rollers 305 and 306 are constantly inclined to opposite directions from the reference line L1.

The rotating arms 371a and 371b described above are molded entirely in the same shape. The rotating arm 371b on the return run side is used with its back side directed to the front side (in a reversed position), reversely to the mounting position of the rotating arm 371a on the forward run side. In this state, the axial center 306' of the pinch roller 306 is inclined in a reverse direction. The components of the rotating arms 371a and 371b are commonized as described above, doing much towards reducing the quantity of components and accordingly lowering the manufacturing cost.

On both sides of the belt pinching unit b1 disposed at center of the outer periphery of the curved belt 301, the belt pinching units b2 and b3 having no driving source are set at a predetermined spacing in a circumferential direction.

Figure 24:
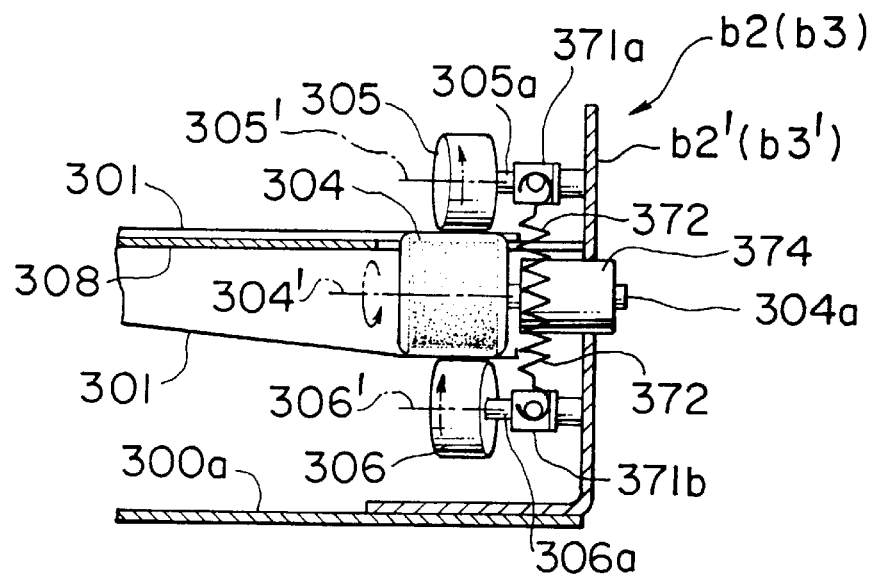
FIG. 24 is a sectional view taken along line XXIV—XXIV in FIG. 21.

As shown in FIG. 24, the belt pinching units b2 and b3 are of the same constitution as the belt pinching unit b1 disposed at center, but differ in the respect that the driving mechanism c is not provided on the outer side face of the unit base plates b2' and b3'. The belt pinching units b2 and b3 are rotatably supported, with the support shaft 304a of the intermediate roller 304 inserted in the shaft support portion 374 fitted in the unit base plates b2' and b3'. The belt pinching units b2 and b3 are entirely the same in construction.

The intermediate rollers 304 of the belt pinching units b2 and b3 are so supported that, similarly to the belt pinching unit b1 at center, the axial center 304' is aligned with the reference lines L2 and L3 connecting the turning center with the outer periphery of the curved belt 301 in a plan view.

The intermediate roller 304 is a little smaller in diameter than the intermediate roller 304 of the belt pinching unit b1 at center.

The use of a larger-diameter intermediate roller for the belt pinching unit b1 at center than the intermediate rollers 304 for the bolt units b2 and b3 is aimed at obtaining a torque and rotational speed required for driving the curved belt 301. The diameter of the intermediate roller 304 and the pinch rollers 305 and 306 of the belt pinching units b1 to b3 may be changed arbitrarily.

As regards the spacing between the belt pinching units b1 and b2, the angle $\alpha2$ formed by the reference line L1 between the turning center O in a plan view and the central belt pinching unit b1 and the reference line L2 between the turning center O and the belt pinching units b2 and the angle $\alpha3$ formed by the reference line L3 between the belt pinching unit b3 and the turning center O are preferably set within the range of about 15° to 22.5° to achieve a good operating condition.

In the case of the curved belt conveyor A3 of the present embodiment, the angles $\alpha2$ and $\alpha3$ are set at 15° as shown in FIG. 21. It is to be noticed, however, that the angle is not limited to the range of 15° to 22.5° stated above, and may be arbitrarily set to any value out of the range.

The belt pinching units b2 and b3 of the above-described constitution are not provided with the driving mechanism c like the central belt pinching unit b1. However, when the curved belt 301 driven by the belt pinching unit b1 is interposed between the intermediate roller 304 and the pinch rollers 305 and 306, the pinch rollers 305 and 306 rotate with the turning of the curved belt 301.

The pinch rollers 305 and 306 of the belt pinching units b2 and b3 also are supported, inclined in a predetermined direction with respect to the reference lines L2 and L3 like the pinch rollers 305 and 306 of the central belt pinching unit b1 as shown in FIG. 24. Therefore, the pinch rollers 305 and 306 in contact with the forward and return run sides of the curved belt 301 rotate with the turning of the curved belt 301, simultaneously pressing towards the outside of turning the outer peripheral section of the curved belt 301 which is turned with the contact force of the pinch rollers 305 and 306.

Next, the dynamic balance acting on each part of the central belt pinching unit b1 with the turning of the curved belt 301 will be explained with reference to FIGS. 26A, 26B, 27A and 27B.

The curved belt conveyor A3 constituted as described above is of such a constitution that when the intermediate roller 304 of the central belt pinching unit b1 is driven to rotate, the forward run side of the curved belt 301 in contact with the upper outer periphery of the intermediate roller 304 moves from the start end side of the conveyor towards the discharge end of the conveyor and at the same time the return run side of the conveyor belt 301 which is in contact with the lower outer periphery of the intermediate roller 304 moves from the discharge end side of the conveyor towards the start end side of the conveyor, consequently turning the curved belt 301 mounted between the rollers 302a and 302b in the normal direction as shown in FIG. 26A and FIG. 26B.

By the way, when the curved belt conveyor A3 is driven in the normal direction as described above, there takes place dynamic balance between the intermediate roller 304 and the pinch rollers 305 and 306. The dynamic balance is entirely the same balance as the dynamic balance produced between the driving roller 4 and the pinch rollers 5 and 6, that is, the dynamic balance explained by referring to FIGS. 8 and 9, when the curved belt conveyor A1 is turning in normal direction as shown in FIG. 27A and FIG. 27B.

Figure 27A:
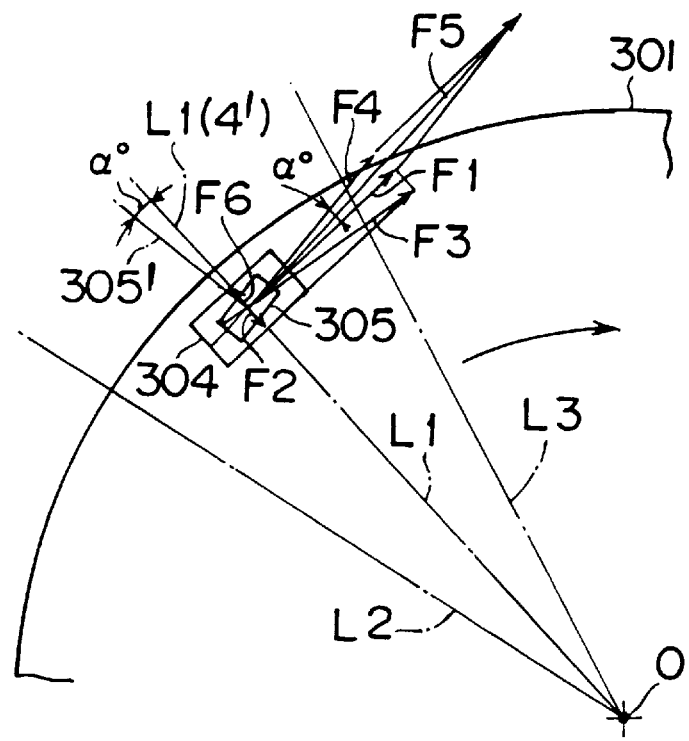

That is, the contact force F4 of the pinch roller 305 acting on the forward run side of the curved belt 301 which is turning, the driving force F1 of the intermediate roller 304, a resultant force F5 of the driving force F1 and the contact force F4, and the pressing force F6 towards the outside of turning in the resultant force F5 act entirely in the same manner as in the case of FIG. 8, thereby receiving the force F2 which forces to move the forward run side of the curved belt 301 toward the inside of turning by the pressing force component F6 and accordingly preventing the curved belt 301 from shifting towards the inside of turning as shown in FIG. 27A.

Figure 27B:
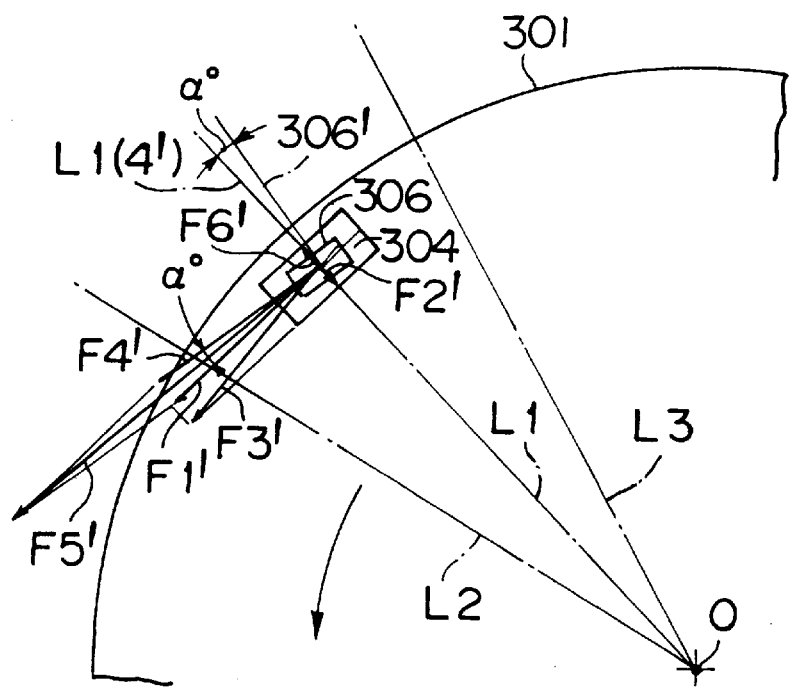

In the meantime, the contact force F4' of the pinch roller 306 acting on the return run side of the curved belt 301, the driving force F1' of the intermediate roller 304, a resulting force F5' of the driving force F1' and the contact force F4', and the pressing force component F6' acting towards the outside of turning in the resultant force F5', act entirely in the same manner as in the case of FIG. 9; the force F2' working to move the forward run side of the curved belt 301 towards the inside of turning is received by the pressing force component F6', thereby preventing the curved belt 301 from moving towards the inside of turning as shown in FIG. 27B.

The right and left belt pinching units b2 and b3 turn the intermediate roller 304 and the pinch rollers 305 and 306 with the turning of the curved belt 301 as described above. At this time, the contact force of the pinch rollers 305 and 306 of the belt pinching units b2 and b3 establishes entirely the same dynamic balance as the pinch rollers 305 and 306 of the central belt pinching units b2 and b3.

The curved belt 301, therefore, is turned by means of the belt pinching unit b1 located at one place at center. At the same time, a pressing force acts towards the outside of turning in three positions in the outer peripheral section of the curved belt 301 mounted with the belt pinching units b1 to b3.

In the curved belt conveyor A3, the outer peripheral section of the curved belt 301 is pressed towards the outside of turning by the forces F6 and F6' built up in the three belt pinching units b1 to b3. The sum of the pressing forces becomes great, with which the forces F2 and F2' acting to move the curved belt 301 towards the inside of turning are offset, and furthermore providing a superfluous force. It is, therefore, unnecessary to provide guide rollers 3a, 3b, 203a, and 203b supporting the curved belts 1 and 201, from the inner peripheral side as in the case of the curved belt conveyors A1 and A2.

That is, the curved belt conveyor A3, equipped with three belt pinching units b1 to b3, may be provided with only one driving mechanism C for the central belt pinching unit b1. It is, therefore, possible to lower the manufacturing cost by simplifying the conveyor construction and reducing the quantity of component parts.

A particularly desirable range of the inclination angle α° of the pinch rollers 305 and 306 for the belt pinching units b1 to b3 is 5° to 10° like that of the curved belt conveyors A1 and A2 described above. However, the inclination angle α° of the pinch rollers is not limited to the value mentioned above and may be set to any value if specific effect can be expected.

Figure 30:
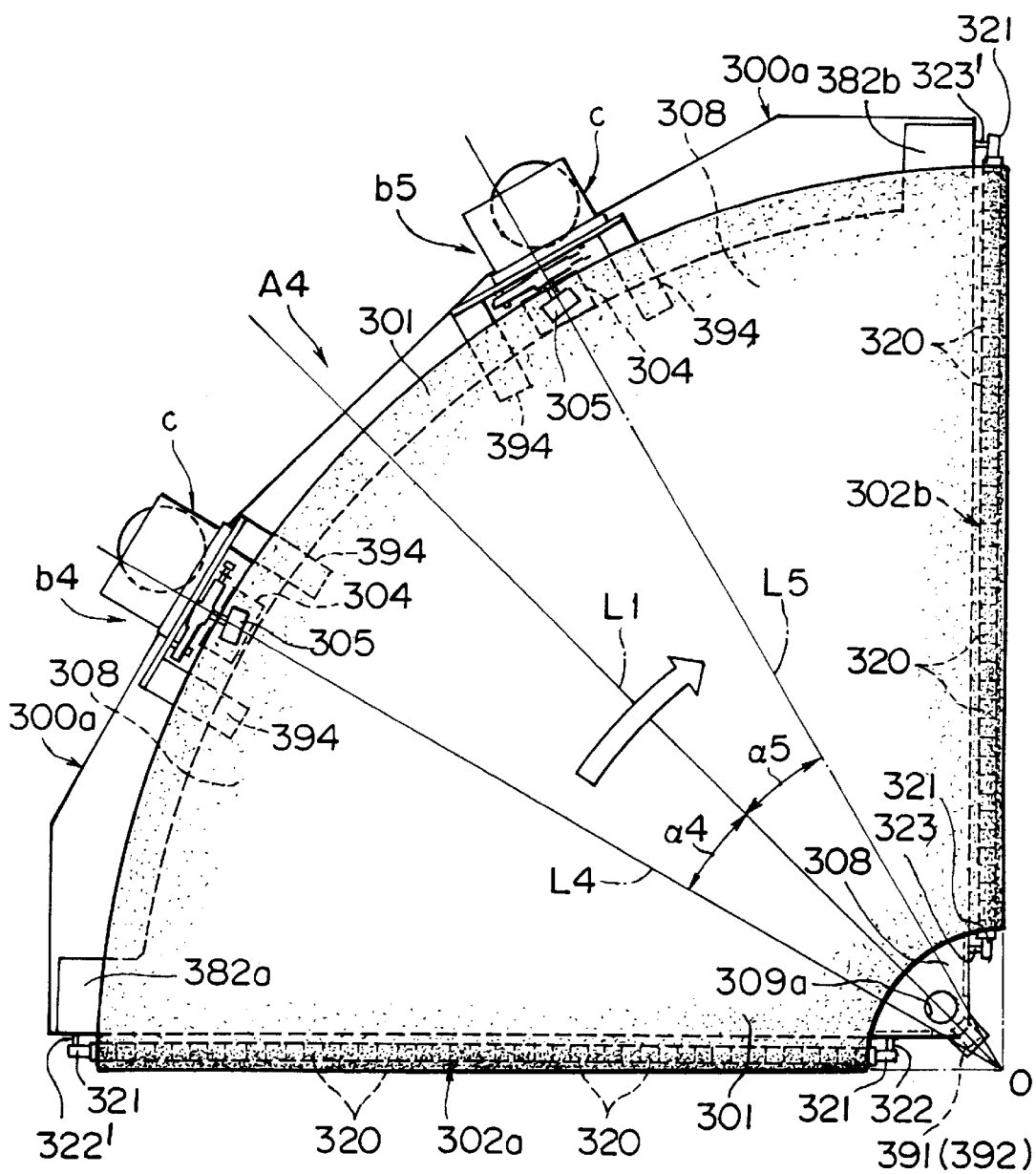
FIG. 30 is a plan view showing the curved belt conveyor having a couple of belt pinching units, and the curved belt conveyor equipped with the driving mechanism in either belt pinching unit.

Next, the curved belt conveyor A4 shown in FIG. 30 will be explained.

The curved belt conveyor A4 is of the same constitution as the curved belt conveyor A3, and features that two belt pinching units b4 and b5 equipped with the driving source c are set at a space in the outer peripheral section of the curved belt 301.

The belt pinching units b4 and b5 also is of entirely the same constitution as the central belt pinching unit b1 of the curved belt conveyor A3, and therefore will not be explained herein.

The belt pinching units b4 and b5 are set so that the angles α4 and α5 between the reference lines L4 and L5 connecting the units b4 and b5 with the turning center O of the curved belt 301 and the center reference line L1 will be 15° respectively.

Since the belt pinching units b4 and b5 are equipped each with the driving mechanism c, the intermediate roller 304 of the units b4 and b5 is driven together; and as the intermediate roller 304 contacts, the curved belt 301 is driven to turn. The curve belt conveyor A4, as described above, is driven at two places on the outer periphery of the curved belt 301, thus ensuring proper turning of the curved belt 301.

At the same time, the force acting to pull the curved belt 301 towards the outside of turning acts on two positions where the belt pinching units b4 and b5 are mounted, providing a sufficient tension to prevent the curved belt 301 from moving towards the inside of turning.

The dynamic balance acting on each part of the belt pinching units b4 and b5 is entirely the same as that of the belt pinching unit b1 (FIG. 27A and FIG. 27B) of the curved belt A3, and therefore will not be explained.

As regards the location of the belt pinching units b4 and b5, a good result can be achieved by setting the angles α4 and α5 formed by the reference lines L4 and L5 between the units b4 and b5 and the turning center O of the curved belt 301 and the central reference line L1 within the range of about 15° to 30°. It is to be noted, however, that the angles mentioned above are not limited to the range of 15° to 30° but may be set arbitrarily to any value out of the range.

In the curved belt conveyor A4 of the above-described constitution, the outer peripheral section of the curved belt 301 is pressed in a wide range by the two belt pinching units b4 and b5 connected to the driving mechanism c, enabling to reliably drive the curved belt 301 by the intermediate rollers 304 and at the same time to impart a uniform pressure in a wide range to move the belt towards the outside of turning. The wide and uniform pressure, therefore, can give a sufficient tension to the curved belt 301 in the direction of width against a shifting force which tends to move the curved belt away towards the inner peripheral side of turning.

Figure 31:
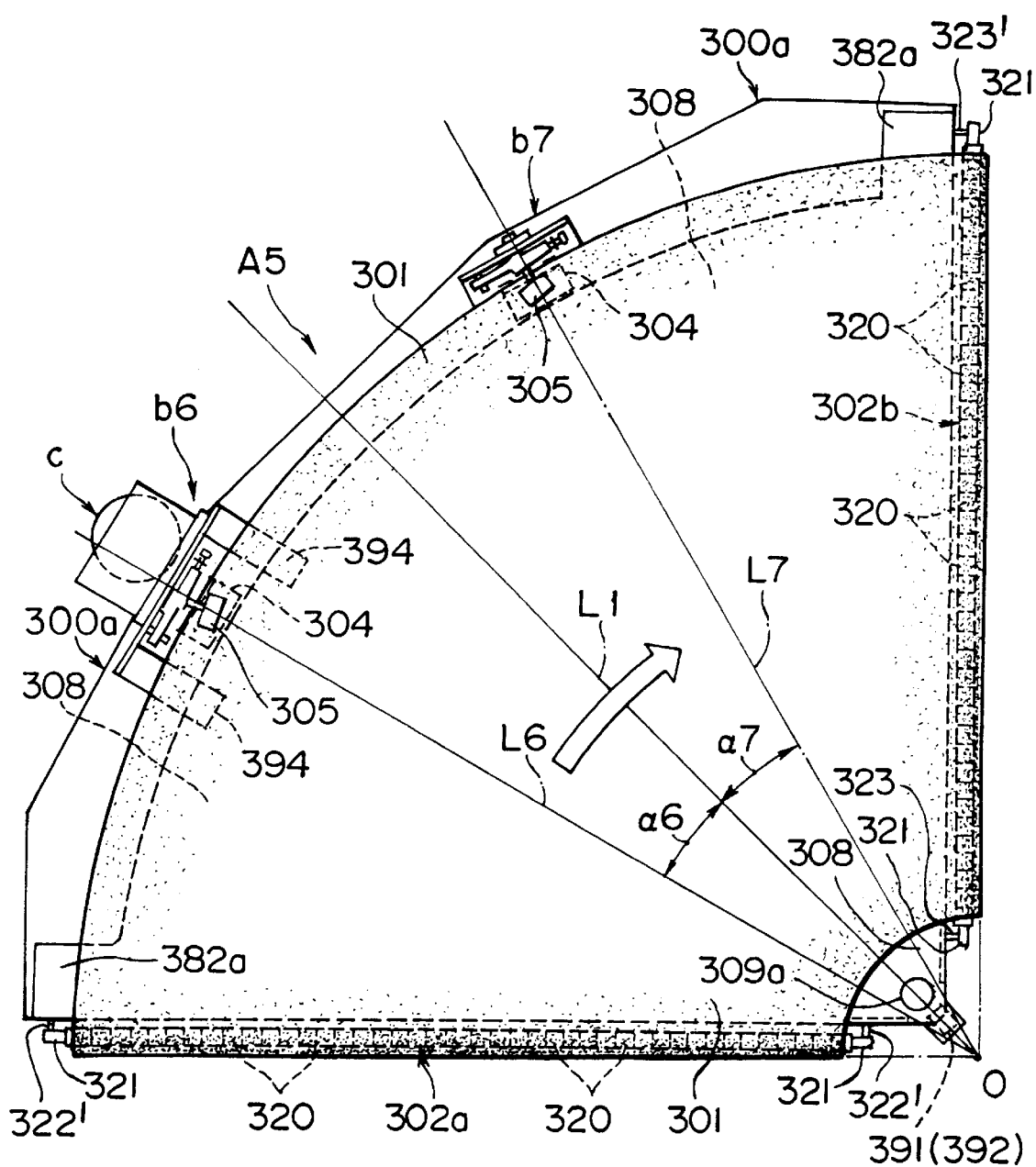
FIG. 31 is a plan view showing the curved belt conveyor equipped with a couple of belt pinching units, in one of which the driving mechanism is mounted.

Next, the curved belt conveyor A5 shown in FIG. 31 will be explained.

The curved belt conveyor A5 is entirely the same in constitution as the curved belt conveyor A4 described above, and features that, of the two belt pinching units b6 and b7, only the unit b6 on the start end side of the conveyor is provided with the driving mechanism c.

The belt pinching unit b6 has entirely the same constitution as the central belt pinching unit b1 of the curved belt conveyor A3. Also the belt pinching unit b7 at the discharge end side of the conveyor is also entirely the same in constitution as the belt pinching units b2 and b3 of the curved belt conveyor A3. Therefore the construction of these units b6 and b7 will not be described.

The belt pinching units b6 and b7, like the belt pinching units b4 and b5 of the curved belt conveyor A4, are disposed in a position in which the angles α6 and α7 of 15° are formed by the reference lines L6 and L7 between the turning center O of the curved belt 301 and the belt pinching units b6 and b7 and the central reference line L1.

Since, in the curved belt conveyor A5, the driving mechanism c is provided only for the belt pinching unit at the start end side of the conveyor, the intermediate roller 304 of the belt pinching unit b6 rotates to turn the curved belt 301 which is in contact with the intermediate roller 304. Also, the intermediate roller 304 and the pinch rollers 305 and 306 of the belt pinching unit b7 at the discharge end side rotate with the turning of the curved belt 301.

The driving mechanism c, when provided only for the belt pinching unit, is preferably disposed at the start end side of the curved belt 301 for the purpose of preventing slackening of the curved belt 301.

In the meantime, the force pulling the curved belt 301 towards the outside of turning similarly acts on two places where the belt pinching units b6 and b7 are mounted, gaining a sufficient tension to prevent the contact force of the pinch rollers 305 and 306 from moving the curved belt 301 towards the inside of turning.

In the conveyor construction in which the driving mechanism c id provided for only one of the two belt pinching units b6 and b7, sufficient torque and tension can be given to the curved belt 301 by the two belt pinching units b6 and b7; and as only one driving mechanism c is employed, the quantity of component parts can be decreased and accordingly the manufacturing cost can be lowered.

In the curved belt conveyor A5 also, like the curved belt conveyor A4, it is preferable to set the belt pinching units b6 and b7 within the range of angle of about 15° to 30° between the reference lines L6 and L7 and the central reference line L1. However, the mounting position of the belt pinching units b6 and b7 is not limited to the range of angle of 15° to 30°, and may be set to any value out of this range.

Furthermore, in the curved belt conveyors A3 to A5 of the present embodiment, the rollers 302a and 302b at both ends of the conveyor are arranged at the angle of 90°; in the curved belt conveyor of the present invention, however, the angle is not limited to 90° and may be set to 90° or less and 90° or more (not illustrated).

Figure 32:
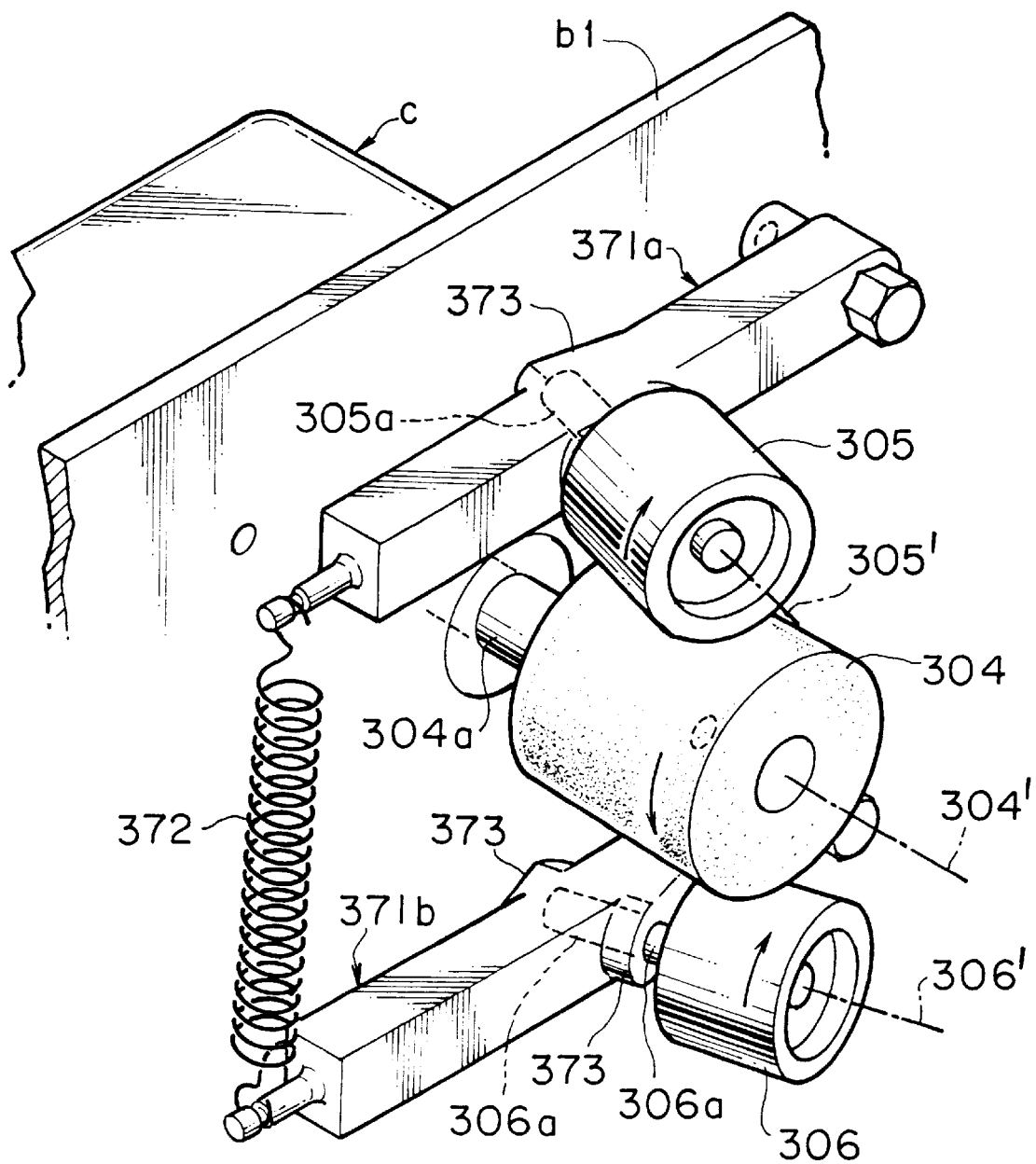
FIG. 32 is a perspective view showing the belt pinching unit at the central section during reverse operation.
Figure 33:
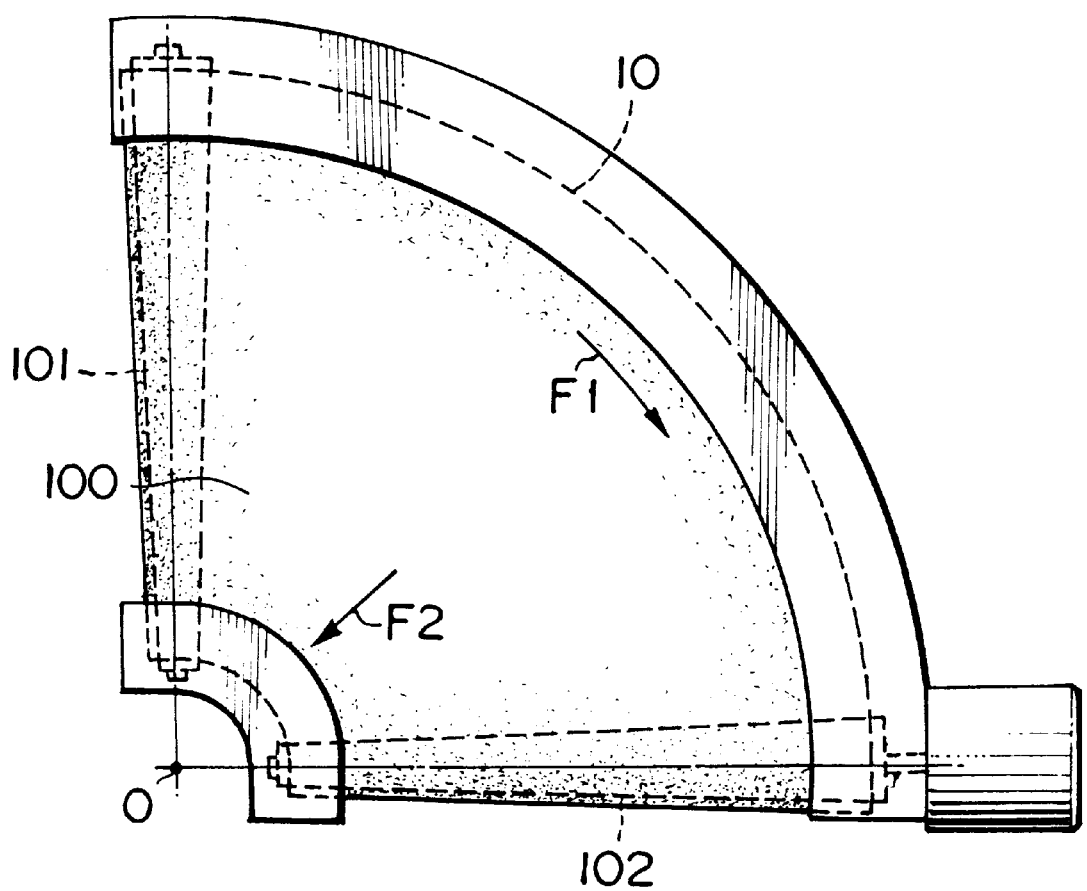
FIG. 33 is a plan view showing a conventional curved belt conveyor.

In the curved belt conveyors A3 to A5 described above, the curved belt 301 is turned in the normal direction from the end of the conveyor roller 302a to the end of the roller 302b. However, the conveyors A3 to A5, as indicated by an alternate long and two short dashes line in FIG. 23 and as shown in FIG. 32, the axes of the rotating arms 371a and 371b supporting the pinch rollers 305 and 306 are supported on the opposite side on both sides of the axial center 304' of the intermediate roller 304. And the inclination of the pinch rollers 305 and 306 are reversed in a plan view. Also the curved belt 301 can be driven in the reverse direction by reversely rotating the intermediate roller 304 which serves as a driving roller.

According to the purport of the present invention, the quantity of the belt pinching units to be set is not limited so long as it is plural. In the curved belt conveyors A3 to A5 of the present embodiment, two or three belt pinching units b1 to b7 are set; however, the number of belt pinching units is not limited to two or three as in the present embodiment, but may be four and more. In this case also, it is sufficient to mount the driving mechanism for at least one belt pinching unit. That is, the driving mechanism may be mounted for two or more or for all the units.

EFFECT OF THE INVENTION 1.1 The curved belt conveyor of the present invention, as heretofore explained, is comprised of a curved belt, a guide roller supporting the inner peripheral edge section of the curved belt, a driving roller mounted at the outer peripheral section of the curved belt, and forward and return run pinch rollers for pressing the curved belt against the driving roller. The pinch rollers on the forward and return run sides are supported with their axial centers inclined to a predetermined direction with respect to a reference line. Therefore when compared with a conventional curved belt conveyor in which the outer peripheral edge section of the curved belt is supported by such a holding mechanism as a guide rail, chain, etc., the curved belt driving mechanism can be made extremely simple, and at the same time the curved belt can be driven reliably without producing a noise in the holding mechanism.

1.2 The pinch roller is supported, with its axial center inclined with respect to the reference line, to press the outer peripheral section of the forward and return run sides of the curved belt towards the outside of turning, thereby imparting a sufficient tension in the direction of width of the curved belt against a force by which the curved belt tends to be moved away towards the inner peripheral side of turning.

As a result, such a symptom as bulging of the carrying surface likely to occur when the curved belt is increased in width can be prevented, thus ensuring smooth operation of the curved belt without a trouble experienced in conventional curved belt conveyors.

Also, since the escape of the curved belt can be prevented by maintaining the tension stated above, it is possible to reduce a difference in level at the conveyor junction by decreasing the rollers at both ends of the belt, thus enabling smooth conveyance of small, short, light-weight loads.

The curved belt conveyor according to claim 2 is of such a constitution that the direction of rotation of the driving roller is switched by operating the changeover lever, to thereby swing the pinch rollers on the forward run side and the return run side from the normal direction to the reverse direction and vice versa with respect to the reference line in order to maintain a predetermined inclination angle. Also, with the normal or reverse rotation of the driving roller, the pinch rollers rotate to contact the curved belt, thus constantly pressing the outer peripheral section of the curved belt towards the outside of turning.

2.1 Therefore, the present invention is advantageous similarly to 1.1 and 1.2: the direction of operation of the curved belt can very easily and reliably changed simply by operating the changeover lever, and furthermore, unlike the conventional curved belt conveyor in which the outer peripheral edge of the curved belt is supported by such holding mechanisms as beads, guide rails, chains, rollers, etc., a number of accessories used along the outer periphery of the curved belt can be dispensed with. Moreover the driving mechanism can be substantially simplified, and drive the curved belt without producing noise in the holding mechanism.

2.2 Furthermore, the axial center of the pinch rollers on the forward and return run sides are inclined to the predetermined normal or reverse direction in relation to the reference line by operating the changeover lever with the change of the direction of rotation of the driving roller. In this state, the outer peripheral section on the forward and return run sides of the curved belt is constantly pressed towards the outside of turning. It is, therefore, possible to impart a sufficient tension in the direction of width of the curved belt during either of normal operation and reverse operation, thus efficiently overcoming the shifting force acting to move the curved belt away towards the inner peripheral side of turning.

As a result, it becomes possible to reliably prevent such a symptom of trouble as bulging of the curved belt surface of increased width. That is, a wide curved belt can be operated smoothly without the above-described disadvantage inherent to curved belts of conventional construction.

2.3 Rollers on which the curved belt is mounted are comprised of a number of approximately cylindrical, small, short rollers which are coaxially juxtaposed, so that the small rollers can freely rotate independently. Therefore, during operation of the curved belt, the small rollers coaxially juxtaposed freely rotate independently at their respective peripheral speeds in their positions, thereby absorbing a difference in the peripheral speed between the outer peripheral side and the outer peripheral side of the curved belt mounted between the rollers and accordingly doing much towards smooth operation of the curved belt.

The small rollers, being sufficiently small in outside shape, can largely contribute to decreasing a difference in level at a junction with other conveyor connected to one end or other end of the curved belt conveyor of the present invention, thus ensuring smooth passages of loads through the junction at conveyor ends.

2.5 Furthermore, since the curved belt conveyor uses a flat curved belt, all projecting parts such as beads, rails, etc. in the outer peripheral section of the conventional curved belt can be dispensed with. Consequently, it is possible to improve the flexibility of the outer peripheral section of the curved belt, to simplify the shape of the curved belt itself, and consequently to simplify manufacturing processes.

3.1/4.1 In the curved belt conveyor according to claim 3 and claim 4, the guide rollers in the curved belt conveyor of claim 1 or claim 2 are axially mounted on a base member; the base member being removably fastened in relation to a predetermined position of a conveyor body side member on the inner peripheral side of the curved belt to thereby set the guide rollers in their support positions at the inner peripheral edge of the curved belt. Therefore, the guide roller supporting the inner peripheral edge of the curved belt can be removed by removing the base member from the stationary member, and also the endless curved belt mounted between the rollers and knife edges can be drawn out to the inner peripheral side of turning. Also the mounting of the curved belt can be done by reversing the above-described procedure.

It is, therefore, possible to perform removal and installation of the curved belt quite easily, and accordingly to substantially decrease time for belt and machine washing operation to be regularly carried out for check and maintenance, and sanitary control.

The curved belt conveyor according to claim 5 is provided with a plurality of belt pinching units along the outer peripheral section of the curved belt in the conveyor body. The belt pinching unit is comprised of an intermediate roller inserted in the outer peripheral section of the curved belt, and pinch rollers on both the forward and return run sides for holding the forward and return run sides of the outer peripheral section of the curved belt to thereby press the curved belt against the outer peripheral surface of the intermediate roller. The driving mechanism is connected to the intermediate roller of at least one of the belt pinching units to turn the curved belt with the rotation of the intermediate roller. Also, the pinch rollers on the forward and return sides of the belt pinching unit are rotatably supported with the axial center inclined to a predetermined direction, so that the outer peripheral section of the curved belt, being in contact with the pinch rollers, will be moved towards the outside of turning.

5.1 The curved belt conveyor of the present invention is equipped with a plurality of belt pinching units, which can fully drive and hold the curved belt.

At the same time, the conveyor has the same advantage as 2.1.

5.2 The curved belt conveyor of the present invention is equipped with the plurality of belt pinching units, that drive the outer peripheral section of the curved belt towards the outside of turning in the position of the belt pinching unit. Therefore it is possible to uniformly press, in a wide range, the outer peripheral section of the curved belt towards the outside of turning; furthermore, because of the uniform pressure applied to the wide range of the curved belt, a uniform and sufficient tension is applied in the direction of width of the curved belt against a shifting force which moves the curved belt away towards the inner peripheral side of turning.

As a result, it is possible to largely increase the width of the curved belt for use on a large curved belt conveyor.

Actually, even when a one-meter or wider curved belt is used, the conveyor can smoothly operate without a trouble such as bulging of the belt surface and shifting of the belt towards the turning center.

5.3 Since the use of the plurality of belt pinching units can maintain a uniform curved belt tension in a wide range, the curved belt can be prevented from moving off position; and therefore it is possible to reduce the diameter of knife edges and rollers used at both ends of the belt, thereby ensuring smooth conveyance of small, short, light-weight loads.

5.4 Rollers on which the curved belt is mounted are comprised of a number of approximately cylindrical, small, short rollers which are coaxially juxtaposed, so that the small rollers can freely rotate independently, and therefore can obtain an advantage similarly to 2.4.

5.5 Furthermore, in the curved belt conveyor the outer peripheral section of the curved belt is flat and therefore can obtain an advantage similarly to 2.5.

6.1 In the curved belt conveyor according to claim 6, the holding member for holding the portion on the turning center side of the base is removably mounted. Also, the upper support roller is mounted on the lower surface on the turning center side of the base and the lower support roller is set on the conveyor body member immediately under the upper support roller, so that the outer peripheral surfaces of the upper and lower support rollers are in contact with each other.

6.2 When the curved belt is to be removed, therefore, the upper and lower support rollers will support the turning center and its vicinity of the base in position, in place of the holding member, if the holding member is removed from the base. That is, the removal and installation of the curved belt is done with the holding member removed, it is possible to prevent such a trouble as deformation resulting from drooping of the turning center and its vicinity of the base with its weight.

6.3 Furthermore, when the endless curved belt mounted between the rollers at both ends of the conveyor body is to be drawn out towards the inside of turning after the removal of the holding member, belt removing operation can easily be performed by inserting and drawing the return run side of the curved belt through between the upper and lower support rollers. Also, mounting of the curved belt can be easily performed by reversing the procedure of removal.

6.4 The removal and installation of the curved belt can be carried out quite easily within a short time simply by removing and installing the holding member. As a result, therefore, it is possible to substantially decrease time for belt and machine washing operation to be regularly carried out for check and maintenance, and sanitary control, thereby contributing towards the maintenance of sanitary equipment.

6.5 Furthermore, the upper and lower support rollers whose outer peripheral surfaces are in contact with each other will rotate as the curved belt is drawn out for removal; therefore removal of the curved belt can be smoothly carried out without giving such impairment as hitch and scratch to the curved belt.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A curved belt conveyor, comprising: an endless curved belt mounted between rollers or knife edges disposed at both ends of a conveyor to form an approximately circular carrying track in a plan view; a guide roller supporting the inner peripheral edge section of said curved belt from the inside of turning; a driving roller set by inserting between said forward run side and return run side in the outer peripheral section of said curved belt and rotatably supported with the axial center aligned with the reference line extending from the turning center of said curved belt in a plan view towards the outer periphery of said belt; a pinch roller set on the forward run surface of the outer peripheral section of said curved belt to press said curved belt against the outer peripheral surface of said driving roller; and a pinch roller set under the return run side of the outer peripheral section of said curved belt to press said curved belt against the outer peripheral surface of said driving roller; said pinch rollers on the forward run side and the return run side being rotatably supported with the axial center inclined to a predetermined direction with respect to a reference line in a plan view, and contacting to press the outer peripheral section of said curved belt towards the outside of turning when rotated.

2. A curved belt conveyor according to claim 1, wherein said guide roller is mounted on a base member; said base member being fixed on a conveyor body side member on the inner peripheral side of said curved belt, and removably mounted and secured, to set said guide roller in a supporting position of the inner peripheral edge of said curved belt.

* * * * *